United States Patent
Lalam

(10) Patent No.: US 10,747,694 B2
(45) Date of Patent: Aug. 18, 2020

(54) MULTI-LEVEL DATA CACHE AND STORAGE ON A MEMORY BUS

(71) Applicant: Fusion Memory, Carlsbad, CA (US)

(72) Inventor: Arvindhkumar Lalam, Carlsbad, CA (US)

(73) Assignee: nCorium, Los Altos, CA (US)

( * ) Notice: Subject to any disclaimer, the term of this patent is extended or adjusted under 35 U.S.C. 154(b) by 222 days.

(21) Appl. No.: 15/615,800

(22) Filed: Jun. 6, 2017

(65) Prior Publication Data

US 2017/0351626 A1    Dec. 7, 2017

Related U.S. Application Data

(60) Provisional application No. 62/346,567, filed on Jun. 7, 2016.

(51) Int. Cl.
| | |
|---|---|
| *G06F 13/16* | (2006.01) |
| *G06F 13/40* | (2006.01) |
| *G06F 12/0802* | (2016.01) |
| *G06F 12/0897* | (2016.01) |

(52) U.S. Cl.
CPC ...... *G06F 13/1694* (2013.01); *G06F 13/4027* (2013.01); *G06F 12/0802* (2013.01); *G06F 12/0897* (2013.01)

(58) Field of Classification Search
CPC ............. G06F 12/0897; G06F 12/0811; G06F 13/1694; G06F 13/4027; G06F 2212/205; G06F 12/0802
See application file for complete search history.

(56) References Cited

U.S. PATENT DOCUMENTS

| | | |
|---|---|---|
| 2010/0191898 A1 | 7/2010 | Kim et al. |
| 2010/0332775 A1 | 12/2010 | Kapil et al. |
| 2014/0129767 A1* | 5/2014 | Ramanujan ......... G06F 12/0897 711/105 |
| 2015/0242313 A1 | 8/2015 | Lee et al. |
| 2016/0011802 A1 | 1/2016 | Berke |
| 2017/0153994 A1* | 6/2017 | Royer, Jr. ............... G06F 13/30 |

FOREIGN PATENT DOCUMENTS

WO    2013048483 A1    4/2013

* cited by examiner

*Primary Examiner* — Ernest Unelus
(74) *Attorney, Agent, or Firm* — Loginov & Associates, PLLC; William A. Loginov

(57) ABSTRACT

This invention provides a system having a processor assembly interconnected to a memory bus and a memory-storage combine, interconnected to the memory bus. The memory-storage combine is adapted to allow access, through the memory bus, a combination of random access memory (RAM) based data storage and non-volatile mass data storage. A controller is arranged to address the both RAM based data storage and the non-volatile mass data storage as part of a unified address space in the manner of RAM.

13 Claims, 37 Drawing Sheets

MULTI-LEVEL DATA CACHE AND STORAGE ON A MEMORY BUS

FIELD OF THE INVENTION

This invention relates to data storage and memory for computer systems.

BACKGROUND OF THE INVENTION

FIG. 1 shows an example of typical architecture for a server or a PC station arrangement 100 with a processor 110 having four (4) cores (Core1-Core4). Internal to the processor, each core has its dedicated caches (Core1-L1-Core4-L1, Core1-L2-Core4-L2) and a shared cache (L3, in this example). All these internal memory elements are typically based on (e.g.) SRAM technology. SRAM offers very low latencies, very high speed and unlimited endurance. However, this implementation is costly, offers limited capacity, and is volatile (loses data in case of a power loss).

Away from the processor 100, dynamic random access memory (DRAM) 120 is currently the fastest acting memory that is accessible. DRAM components are available in various form factors: dual-inline memory module (DIMM), non-volatile DIMM (NVDIMM), or other customized memory arrangements, which should be clear to those of skill. In the exemplary computing arrangement 100 shown in FIG. 1, the processor 110 accesses the DRAM components through the dual data rate (DDR) interface 122, including a conventional North Bridge 124. DRAM is very area-efficient compared to static RAM (SRAM), and hence provides relatively higher capacity at lower unit cost, compared to SRAM. DRAM also offers low latencies, high speeds, high endurance, and is relatively lower cost than SRAM. However, DRAM is still costly when compared to other storage media, and is volatile.

Beyond DRAM, various storage memory technologies, such as Flash, magnetic, and/or optical storage are available for large scale non-volatile data storage, referred to generally as "traditional mass storage" 140. Traditional mass storage capacities can run into terabyte (TB), petabyte (PB) and beyond. The processor accesses the traditional mass storage devices through the I/O interconnect 130 and associated South Bridge 132 shown in FIG. 1. Note that I/O interconnect further provides several bus-based interface architectures 150, such as Gen-Z, Ethernet, SATA, PCIe, SAS, SCSI, iSCSI, etc. to reach the individual mass storage devices 142, 144, 146, 148 and 149. Traditional mass storage" devices offer high capacities of non-volatile memory at relatively very lower cost per gigabyte (GB). However, such mass storage arrangements have high latency, slower speeds and limited endurance.

New digital electronic memory implementations broadly referred to as "Storage Class Memories" are designed to fall between DRAM and Mass Storage memories in almost all metrics. These include emerging technologies like Resistive RAM (ReRAM), Phase Change Memories (PCM) among others. In addition to the topology shown and described in FIG. 1 for the Memory Bus (122) and I/O interconnect (130), additional exemplary topologies are provided in the computer arrangements 200 and 300 of FIGS. 2 and 3, respectively. As described above, in the arrangement 100 of FIG. 1, the memory bus (using Double Data Rate Protocol, DDR) 120 and I/O interconnect 130 are each instantiated in discrete chipsets/dies, associated with the North Bridge 124 and South Bridge 132, respectively.

Thus, in the exemplary arrangement 200 of FIG. 2, the memory bus 222 originates directly from the processor 210, while I/O interconnect 230 (connected to the mass storage 240 using bus architectures 250) originates in an external I/O chipset 234. Associated I/O connections 212 and 214 respectively connect and control the I/O chipset 234 and memory bus 222, and are provided on the die of the processor 210 in this example. The memory bus 222 accesses DRAM (DIMM and NVDIMM) 220 in a conventional manner.

In the exemplary arrangement 300 of FIG. 3, all the interfaces (I/O interconnect 330, SAS 352, Ethernet 354, SATA 356, PCIe 358, others 359, and memory controller 314) are instantiated directly within the die of the processor 310. These communicate via appropriate data bus architectures with traditional mass data storage 340 of various types, as described above. As described above, according to a conventional implementation, the exemplary processor arrangement 310 accesses DRAM (DIMM, NVDIMM) 320 through the memory bus 322. Other exemplary topologies using Gen-Z and/or similar emerging technologies are also available as a combination of ones shown in FIG. 1, FIG. 2 and/or FIG. 3.

Some NVDIMM implementations (NVDIMM-N) have DRAM and Flash memory, arranged so that Flash has just enough space to accommodate the content stored in DRAM. For example, an NVDIMM with 8 GB DRAM may have 8 GB to 16 GB of Flash memory associated therewith. In case of power loss or another failure condition, data from DRAM is backed up in the Flash memory, thereby providing a failover solution. When power is restored, the data is restored from the flash memory to the DRAM, and processing continues as before. In this implementation, as shown in the exemplary arrangement 400 of FIG. 4, only DRAM 424 of the DIMM/NVDIMM module 420 is directly addressable on the memory bus 422 and flash memory 426 is not directly addressable on the memory bus 422. A controller 428, and associated function, manages interaction between DRAM 424 and flash 426, and more particularly facilitates moving data from the volatile DRAM to Flash memory and vice versa. Thus, even though there are two types of memories instantiated on the DIMM/NVDIMM module, there is effectively only one layer of addressable memory.

In other NVDIMM implementations (NVDIMM-F), DRAM is used as an internal buffer and is not addressable on memory bus by the processor arrangement 410, etc. Instead, the flash memory is directly addressable on the memory bus. Just like in NVDIMM-N, even though there are two types of memories on the NVDIMM, there is only one layer of addressable memory. Note that in each of the above implementations, NVDIMMs offer limited capacity, due to the limitation on available real estate on the DIMM modules. Likewise, in the depicted arrangements, the only way data can be moved from processor to NVDIMM and vice versa, without (free of) physically disconnecting the persistent storage elements (e.g. Flash 426, mass storage 525) and re-attaching them to the I/O bus 430 directly, is through the memory bus (i.e. DDR interface). This incurs heavy processing penalty for data movement in and out of NVDIMMs. Since NVDIMM data is not available on the I/O interconnect (430 in FIG. 4) and associated mass storage 440 (via buss architectures 450), NVDIMMs cannot be the final resting place for data in this example.

Each of the above-described arrangements essentially separates I/O linking mass storage and I/O linking DRAM into two separate channels, each of which required its own addressing and communication protocols and functions.

DRAM is accessed for working data memory used in relatively contemporaneous processes, and the size of this data space is relatively limited; while mass storage is accessed for large data files and to store processing results for subsequent retrieval at an indefinite future time, and its size can be virtually unlimited.

SUMMARY OF THE INVENTION

This invention overcomes disadvantages of the prior art by providing a computer processor and data storage architecture and associated operating system that allows for the access and use of both DRAM (or equivalent) and mass storage interchangeably, employing a bus architecture and operating system that effectively treats both types of memory as a unified memory, thereby allowing for a very large-scale working memory in association with processor operations. The mass storage can also be accessed via external bus architectures so that it can serve as persistent storage on I/O bus, or via memory bus where the persistent memory is accessed through the memory channel or both.

In an illustrative embodiment, a computing system includes a processor assembly interconnected to a memory bus and a memory-storage combine, interconnected to the memory bus, adapted to allow access, through the memory bus, of a combination of different memory types. A controller is arranged to address the combination of memory types as part of a unified address space via the memory bus. The combination is organized in layers of memory in a manner in which at least one of the layers constitutes a final resting place for data employed by the processor. Illustratively, an I/O interconnect is provided for accessing the non-volatile mass data storage, and/or a backdoor interconnect is provided, which allows communication between external devices and the non-volatile mass data storage. The different memory types can include a random access memory (RAM/DRAM) and a non-volatile mass data storage. The RAM based data storage can define an NVDIMM memory structure, including, but not limited to Storage Class memory. The NVDIMM memory structure can be organized to include at least a first layer NVD cache having DRAM and a second layer NVD cache having the Storage Class memory. The second layer NVD cache can solid state drives (SSDs) in a non-limiting example.

In another illustrative embodiment, a computing system with a processor including a controller and a memory bus is provided. A plurality of memory structures are interconnected to the memory bus, and a mass storage is interconnected with the memory structures, which is addressable via the memory bus that provides a final resting place for data passing between the processor, the memory structures and the mass storage. An interleaver and de-interleaver (module, processor, etc.) arranges packets of the data so that they are interleaved to be distributed among the memory structure and de-interleaved in an organized pattern in each of the processor and the mass storage. Illustratively, the interleaver and de-interleaver causes packets written to memory to become interleaved from the organized pattern in the processor and pass through the memory structures and be stored in the mass storage in the organized pattern. The interleaver and de-interleaver also causes packets read from the memory to become interleaved from the organized pattern in the mass storage and pass through the memory structures and be received by the processor in the organized pattern. The interleaver and de-interleaver is also responsive to a position of each of the memory structures in an overall arrangement of memory structures so that the packets are interleaved and de-interleaved based upon the position of each of the memory structures in the arrangement. Hence, even if memory structures (e.g. NVDIMMs are moved to different slots on the PC board, the organization will remain the same.

In another illustrative embodiment, a computing system includes a processor having a controller and a memory bus, and a plurality of memory structures interconnected to the memory bus. Mass storage is interconnected with the memory structures and is addressable via the memory bus, which provides a final resting place for data passing between the processor, the memory structures and the mass storage. Notably, the mass storage defines a root for a communication protocol topology connecting the mass storage to the memory structures. By way of non-limiting example, the protocol comprises at least one of PCIe, Gen-Z, SATA, SAS, Ethernet, Infiniband®, SCSI, and iSCSI, and/or the memory structures can comprise NVDIMMs.

In another illustrative embodiment, a computing system includes a processor having a controller and a memory bus, and an NVDIMM arrangement, having a controller, also interconnected to the memory bus. A mass storage is interconnected with the NVDIMM arrangement and is addressable via the memory bus, which provides a final resting place for data passing between the processor, the NVDIMM arrangement and the mass storage. The NVDIMM arrangement and the mass storage together define a memory combination. A private high speed connection mates the NVDIMM controller with the mass storage.

In another illustrative embodiment, a computing a processor having a controller and a memory bus, and a plurality of memory structures interconnected to the memory bus. Mass storage is interconnected with the memory structures, and is addressable via the memory bus, which provides a final resting place for data passing between the processor, the memory structures and the mass storage. A backdoor arrangement interconnects the mass storage to external devices free of interconnection to the processor.

In another illustrative embodiment, a method for handling data in a computing system is provides. A processor with a memory bus is interconnected to an NVDIMM arrangement and a mass storage is also interconnected to the memory bus. The mass storage defines part of an address space on the memory bus. Each of the NVDIMM arrangement and the mass storage can be addressed as part of an overall address space to be used by the processor. Data is stored in the mass storage as a final resting place therefor. Illustratively layers of cache can be provided for storing the data and designating at least one layer as the final resting place.

BRIEF DESCRIPTION OF THE DRAWINGS

The invention description below refers to the accompanying drawings, of which.

DETAILED DESCRIPTION

In order to better utilize the available memory in both DRAM or equivalent and mass storage—for example using the capabilities and performance of Storage Class memory—the following description provides various embodiments of a system for multi-level cache and storage based on NVDIMM.

I. Multi-Level Extended Memory-Storage Combine on Memory Bus

In terms of addressable memory on the memory bus, conventional NVDIMM solutions have one layer of memory (i.e. DRAM or Flash). In terms of types of memories present in the NVDIMM solution, conventional NVDIMMs have up to two kinds of memories, one volatile (either SRAM or DRAM) and one non-volatile memory (e.g. Flash memory). Note that the second layer is typically used for persistence, backing up DRAM data on a (power) failure event, and is not addressable on the memory bus. Also, in such implementations, Flash memory capacity is limited to capacity that is a multiplier of DRAM capacity. For example, in an 8 GB NVDIMM module, Flash capacity can be between 8 GB and 16 GB. In other embodiments Flash can have a capacity of 128 GB or more. According to the illustrative embodiment described below, more than two layers of addressable memories can be arranged in such a way that the first few memory layers can act as extended cache levels (herein termed an "NVD-Cache"), in which the last layer can be the final resting place of the data.

Figure 5:
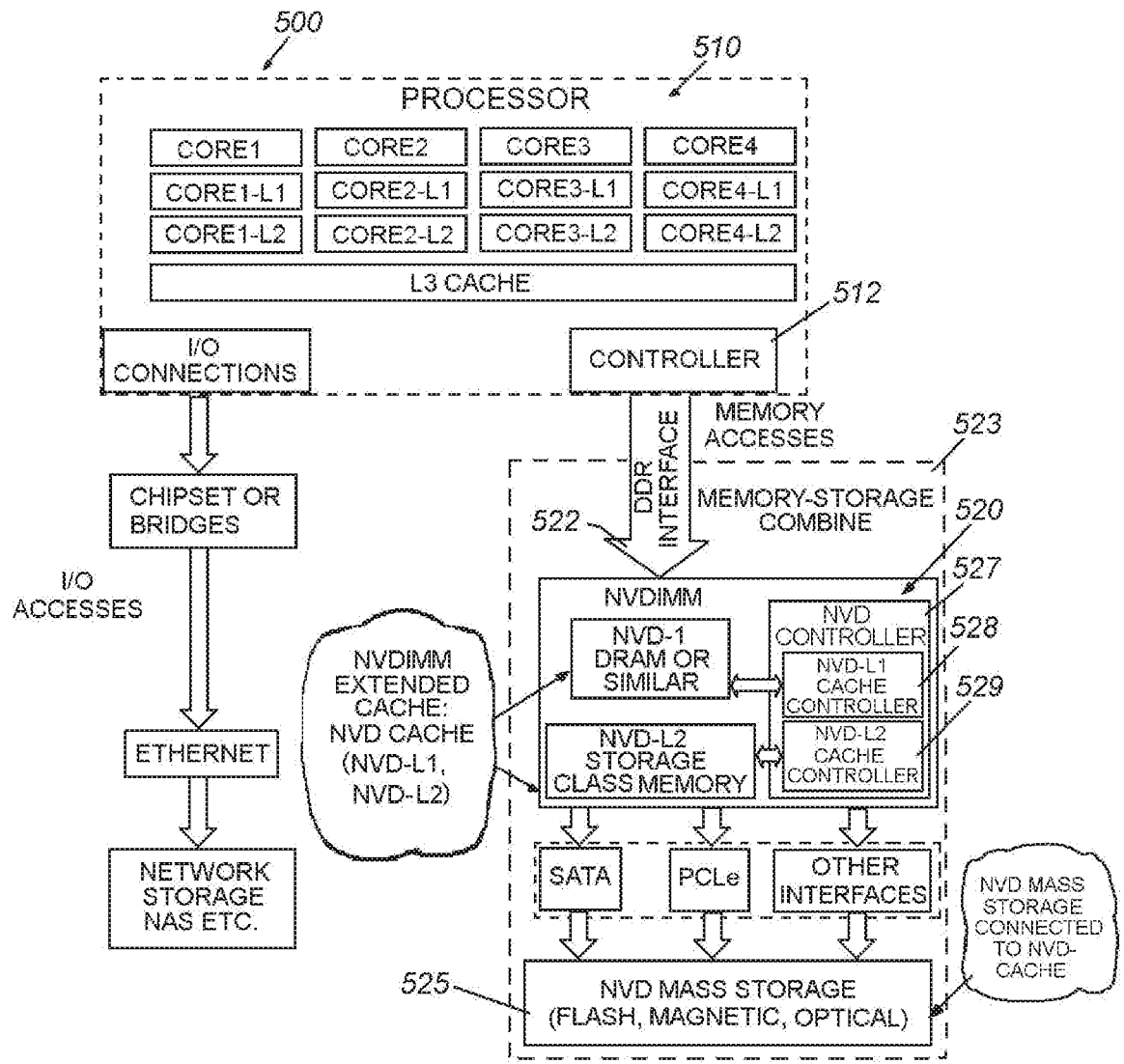
FIG. 5 is a block diagram of a block diagram of a computing system including a novel memory-storage combine and associated controllers residing on the memory bus according to an illustrative embodiment.

In the embodiment shown in FIG. 5, an arrangement 500 is provided in which the processor 510 includes a memory controller, interconnected by a (DDR) interface 522 (which carries memory accesses) to a memory-storage combine 523. The DRAM 520 (or technologies with comparable or better latencies/speed) forms the first layer of a memory-storage combine called NVD-L1. DRAM, SRAM, Storage Class memories or Flash memory (or similar technologies) form the second layer of addressable memory called NVD-L2. The high-capacity, non-volatile memories based on Flash, magnetic media, Storage Class memories or similar memories form the last layer of addressable memory, defined as NVD mass storage 525, and can be situated outside the NVDIMM, interconnected via an appropriate communication bus architecture 526 (e.g. SATA, PCIe, and/or other interfaces). The NVD controller 527 includes associated NVD-L1 and NVD-L2 cache controllers 528 and 529 as shown. All the above levels together comprise a "multi-level extended cache-storage combine". In other exemplary embodiments, more layers or memories can be provided as appropriate and as clear to those of skill.

The various components of Multi-Level extended cache-storage combine implemented in accordance with the example of FIG. 5, and their characteristics, can be provided as follows:

1. NVD-L1: DRAM or other technologies form NVDIMM Extended Cache L1, or NVD-L1—in an embodiment, NVD-L1 is 16 GB of volatile memory like DRAM with 10's nanoseconds of latency and speeds of 2,400 MegaTransfers/second (at 1200 Hz DDR4 clock), or above. In another embodiment, NVD-L1 is any non-volatile memory like MRAM (Magnetic RAM) that has less than 1 nanoseconds of latency. In the embodiment of FIG. 5, the NVD-L1 is placed on the NVDIMM PCB.

Figure 6:
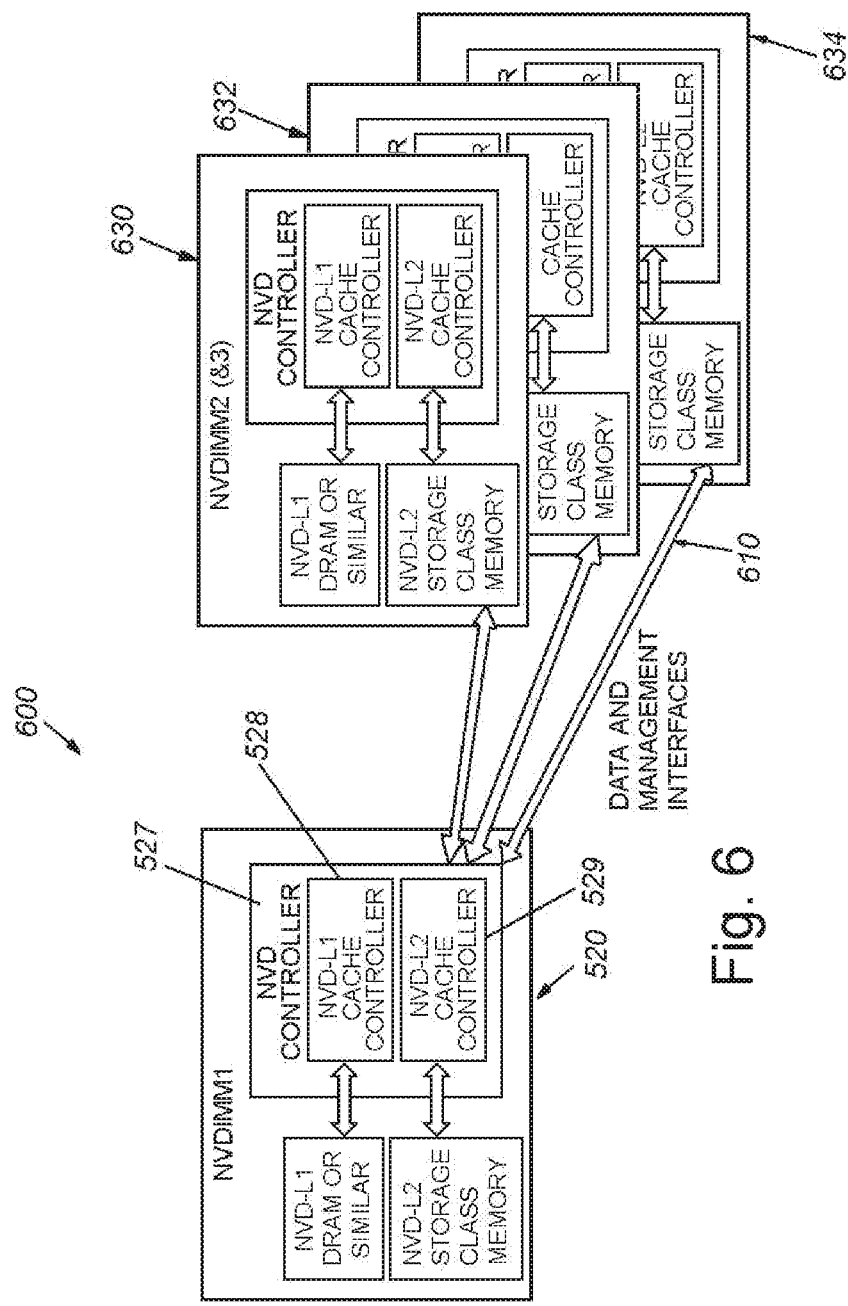
FIG. 6 is a block diagram showing an NVDIMM arrangement applicable to the memory storage combine in accordance with embodiments herein, showing a distributed NVD-L2 cache between similar NVDIMMs.
Figure 7:
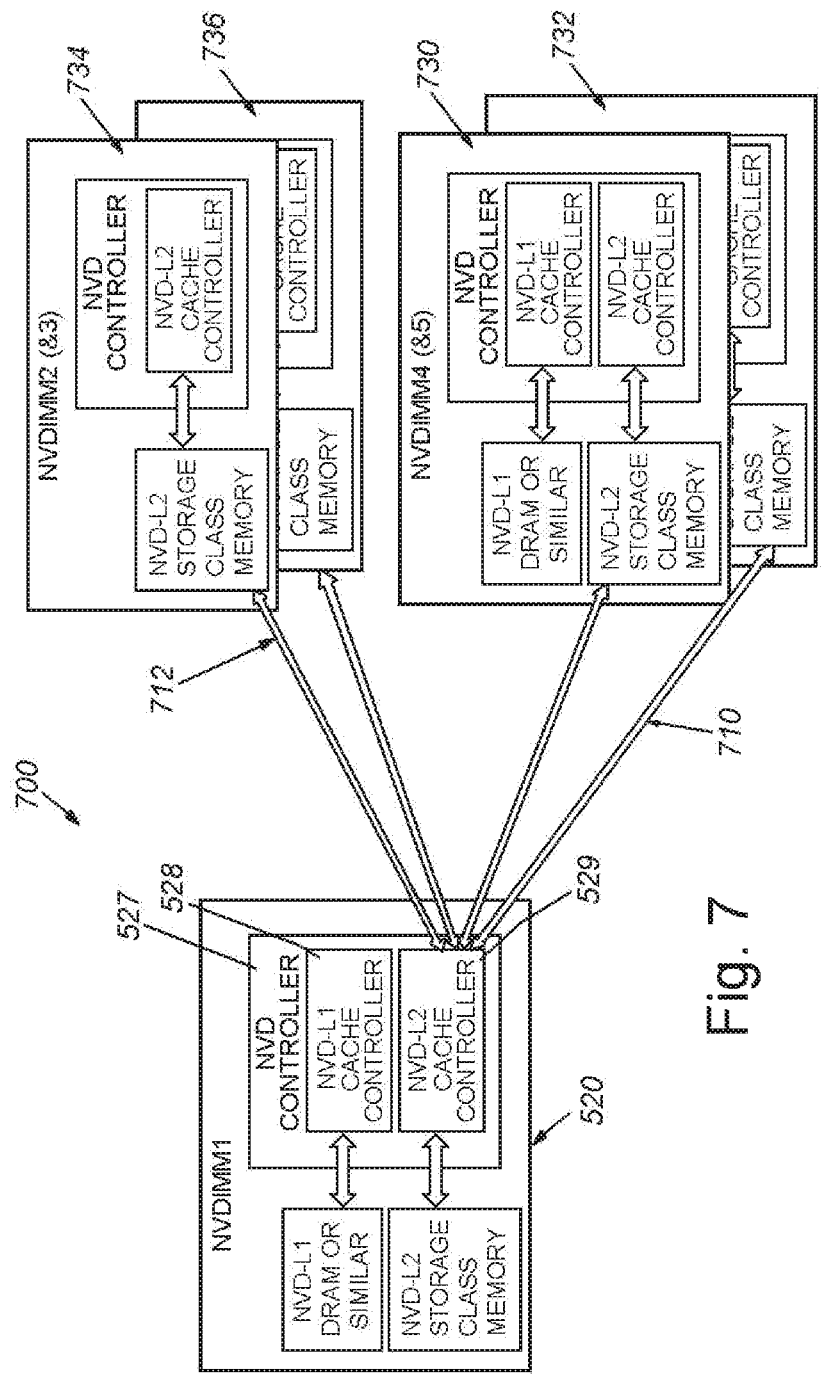
FIG. 7 is a block diagram showing an NVDIMM arrangement applicable to the memory storage combine in accordance with embodiments herein, showing a distributed NVD-L2 cache between dissimilar NVDIMMs.

2. NVD-L2: Memories that are used as a high speed cache are referred to as NVDIMM Extended Cache L2, or NVD-L2. In some embodiments, these may be persistent media that has diminished latencies and speeds than NVD-L1. In other embodiments, NVD-L2 could comprise of volatile DRAM that can either be artificially powered until data is moved to a truly persistent domain or just acting as a volatile buffer. In one embodiment, NVD-L2 could be a 4 GB of DRAM chips with (e.g.) tens (10 s) of nanoseconds of latencies. In an exemplary embodiment, NVD-L2 can be 256 GB of non-volatile ReRAM memory with hundreds nanoseconds of latency. In another exemplary embodiment, NVD-L2 is a 512 GB non-volatile NAND Flash memory with latencies in order of tens of microseconds. NVD-L2 can be (a) physically present on the NVDIMM; (b) physically spread across multiple NVDIMMs, but connected through data and management interfaces to make it logically accessible to one NVDIMM controller; (c) spread across several PCBs with DIMM form factors, but connected through data and management interfaces to make it logically accessible to one NVDIMM controller; or (d) spread across NVDIMM, DIMM and an apparatus connected to the NVDIMM through data and management interface. Depending on whether it is consolidated on one apparatus or spread across several apparatuses, it could be either consolidated NVD-L2 or distributed NVD-L2. Reference is made to the exemplary arrangement 600 of FIG. 6, in which NVDIMM1 520 of FIG. 5 is connected via interfaces 610 to three (3) other similar NVDIMMs (NVDIMM2, NVDIMM3 and NVDIMM4) (630, 632 and 634), each with a similar of identical NVD controller and cache controller architecture for their associated NVD-L1 and NVD-L2. This arrangement provides an effective, distributed NVD-L2 cache between similar NVDIMMs. In the exemplary arrangement 700 of FIG. 7, one NVDIMM (NVDIMM1) 520, as described generally in FIG. 5, is connected to similar NVDIMMs (NVIDMM4 & NVDIMM5) 730 and 732 via interfaces 710, as well as two dissimilar NVDIMMs 734 and 736, with (e.g.) only NVD-L2 Storage Class memories and optional internal buffers (NVDIMM2 and NVDIMM3) via interfaces 712 (i.e. NVD-L1 arrangements/caches are omitted). A variety of other interconnected memory arrangements can be implemented in further alternate embodiments.

Figure 8A:
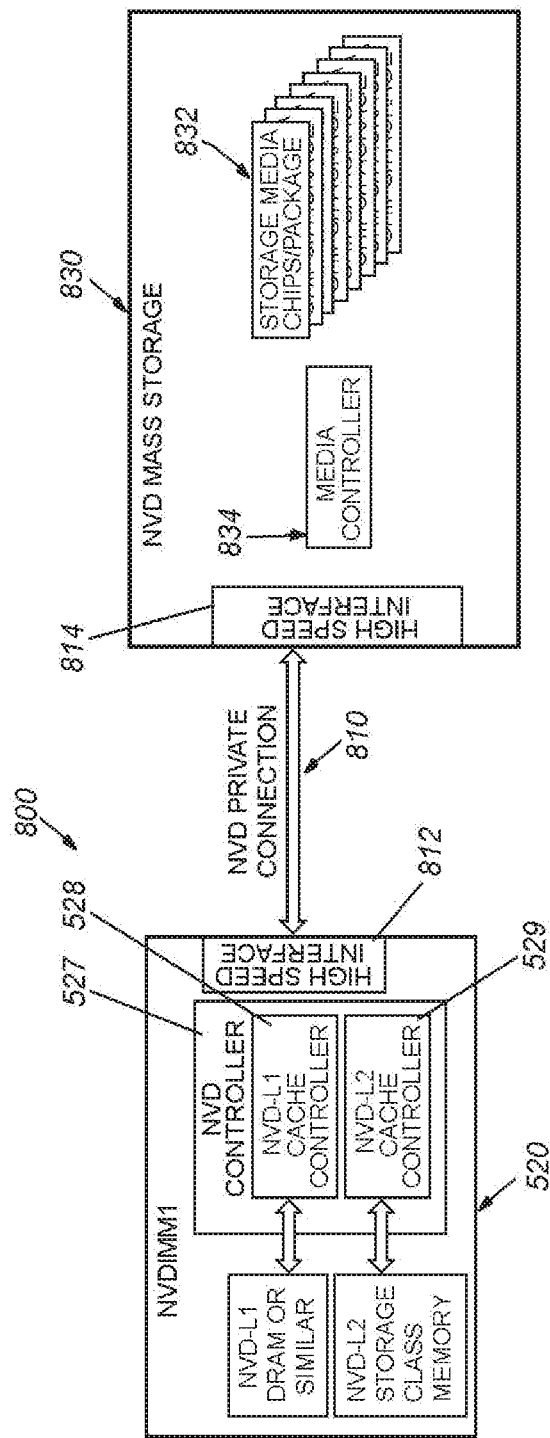
FIG. 8A is a block diagram showing an exemplary NVDIMM arrangement for use in the memory-storage combine herein with a one-to-one correspondence between NVDIMM(s) and mass storage device(s)

3. NVD Mass Storage: Any of traditional storage technologies like Flash memory, magnetic hard disk, optical drive or Storage Class memories can be employed to provide the high capacity storage device that provides a final resting place for the data on the NVDIMM. This storage apparatus is referred to as "NVD mass storage", and in an exemplary embodiment in FIG. 8A, the NVD Mass Storage device contains a 2 TB of Hard Disk storage with approximately 1 millisecond of latency. In another exemplary embodiment, the NVD Mass Storage device can contain 7 TB of 3D NAND storage with 100-microsecond latency. In yet another exemplary embodiment, NVD Mass Storage can be a collection of individual Solid State Drives (SSDs). The NVD mass storage can be implemented as (a) physically located on NVDIMM; (b) physically spread across multiple NVDIMMs, but connected through data and management interfaces to make it logically accessible to one NVDIMM Controller; or (c) physically located in a separate apparatus that is connected to either a single NVDIMM or multiple NVDIMMs through one or many data and management interface(s). Illustratively, as shown in the exemplary arrangement 800 of FIG. 8A, a private high speed connection, referred to as an "NVD Private Connection" 810 can be used to mate the NVDIMM controller 527 (of the exemplary NVDIMM1 520 of FIG. 5 or NVDIMM cache controllers 528, 529 with an NVD mass storage device 830. The device 830 includes one or more storage media chips/package(s) 832 and an associated media controller 834 for access to the chips/package(s) 832. PCIe or similar high speed technologies can be used as the private high speed connections in accordance with skill in the art, and are represented as high speed interface blocks 812 and 814. As shown, the arrangement 800 of FIG. 8 provides a one-to-one mapping of an exemplary NVDIMM (the NVDIMM1 520 of FIG. 5) to a corresponding NVD mass storage apparatus.

Figure 8B:
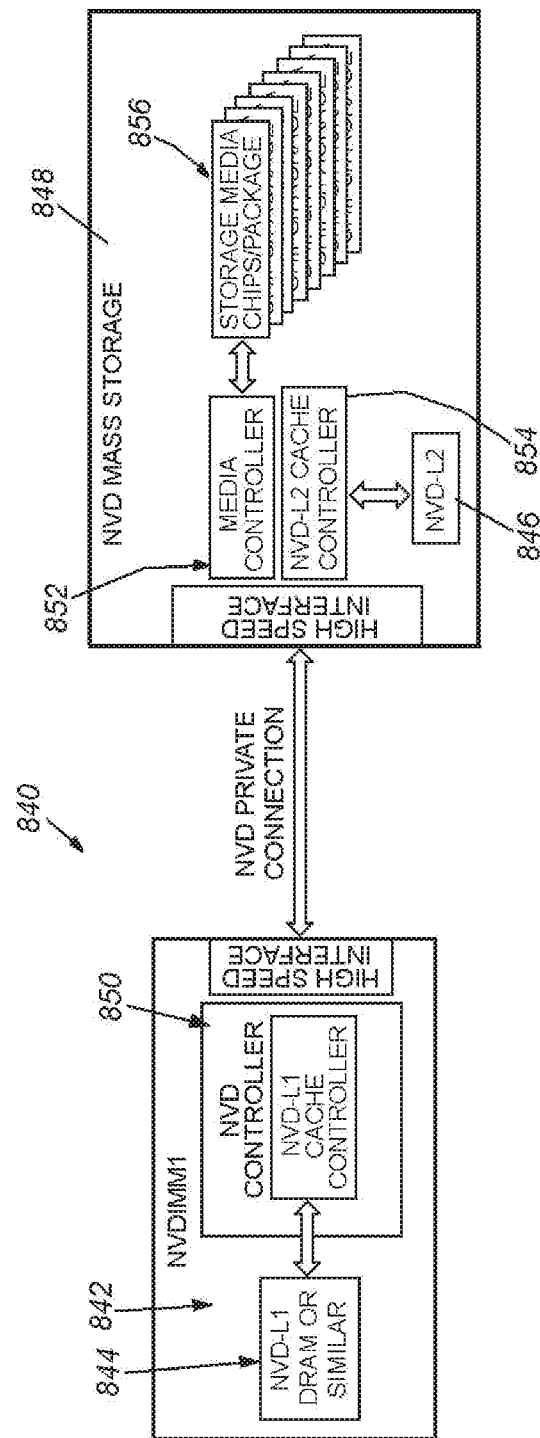
FIG. 8B is a block diagram showing a one-to-one NVDIMM arrangement for use in the memory-storage combine herein with the NVD-L2 cache placed in the NVD mass storage device, according to an alternate embodiment.

FIG. 8B shows an alternate arrangement 840, in which the NVD-L1 (e.g. a DRAM or similar memory structure) 844 resides on the NVDIMM and the NVD-L2 846 resides on NVD mass storage 848. Controllers 850, 852 and 854, storage media chips 856, and other components are also depicted, and operate generally as described above (see FIG. 8A).

Figure 8C:
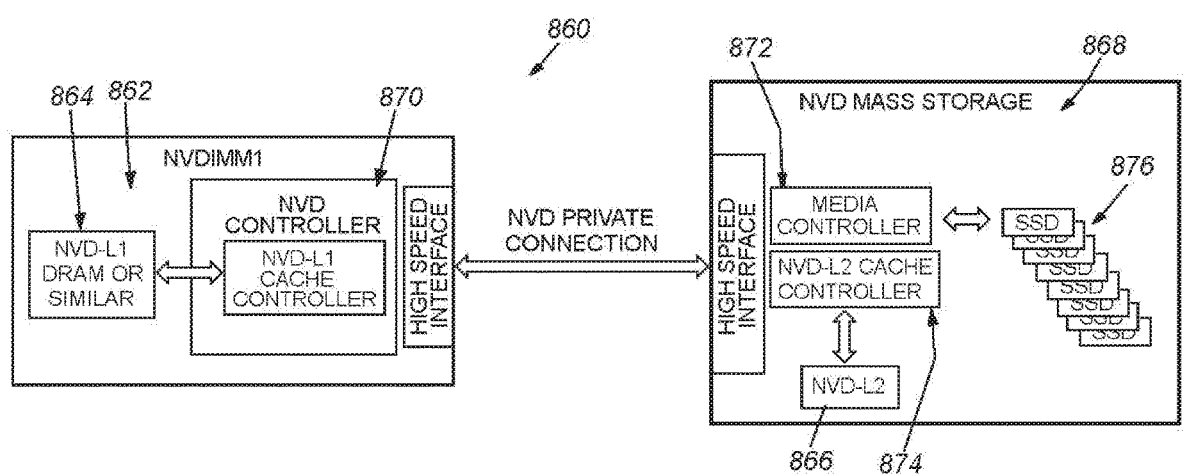
FIG. 8C is a block diagram showing a one-to-one NVDIMM arrangement for use in the memory-storage combine herein with the NVD-L2 cache placed in the NVD mass storage device and SSDs used as the building blocks for mass storage, according to an alternate embodiment.

FIG. 8C shows another alternate arrangement 860, in which the NVDIMM 862 maintains the NVD-L1 (e.g. a DRAM or similar memory structure) 864 and the NVD-L2 866 resides on NVD mass storage 868. In this embodiment, SSDs 876 are provided as the storage building block instead of the above-described storage media chips (856 in FIG. 8B). Appropriate controllers 870, 872 and 874 are provided to control the various components of the arrangement in a manner described generally above.

Figure 9A:
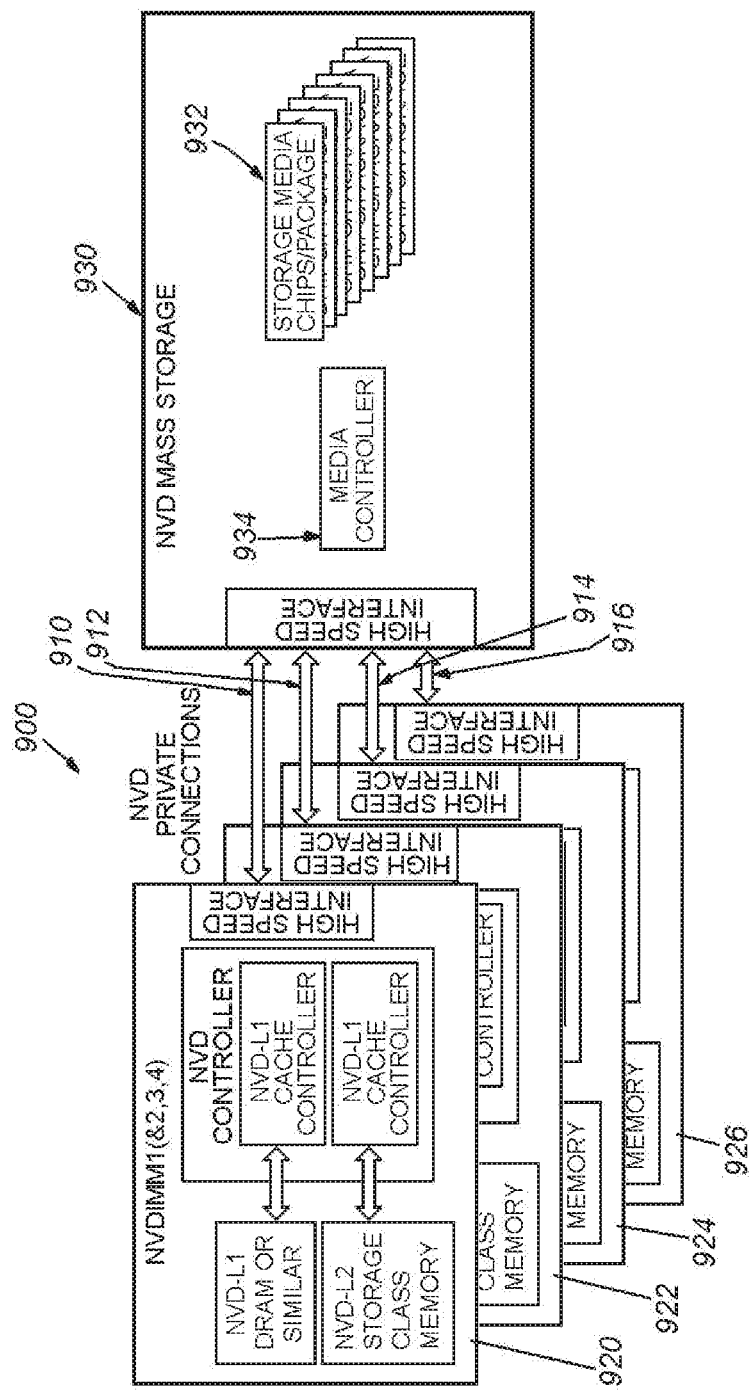
FIG. 9A is a block diagram showing an exemplary NVDIMM arrangement for use in the memory-storage combine herein with a many-to-one correspondence between NVDIMM(s) and mass storage device(s)

In another exemplary arrangement 900, shown in FIG. 9A, a plurality of NVDIMMs 920, 922, 924 and 926 (similar or identical in architecture to NVDIMM 520 of FIG. 5) are mapped, via associated NVD private connections/interfaces, 910, 912, 914 and 916, respectively, into a single NVD mass storage device 930. The device 930 includes a plurality of exemplary storage media chips/packages in this example and an associated media controller 934.

Figure 9B:
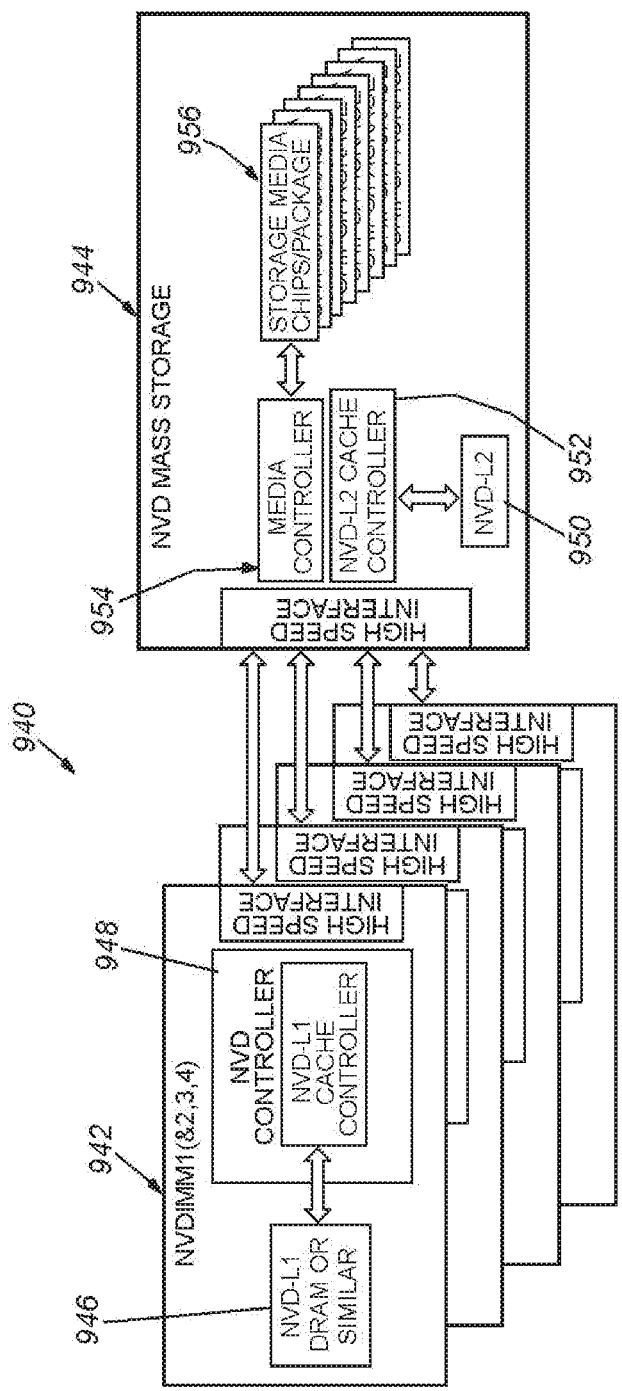
FIG. 9B is a block diagram showing a many-to-one NVDIMM arrangement for use in the memory-storage combine herein with the NVD-L2 cache placed in the NVD mass storage device, according to an alternate embodiment.

In FIG. 9B, the arrangement 940 shows an embodiment in which multiple NVDIMMs 942 are paired with a single NVD mass storage device 944. The NVD-L1 946 resides in each NVDIMM 942, along with controller 948. The NVD-L2 950 (with appropriate controller 952) resides in the single NVD mass storage device 944 and is shared between all NVDIMMs 942. A plurality of storage media chips 956 and associated media controller 954 are employed in the NVD mass storage device 944.

Figure 9C:
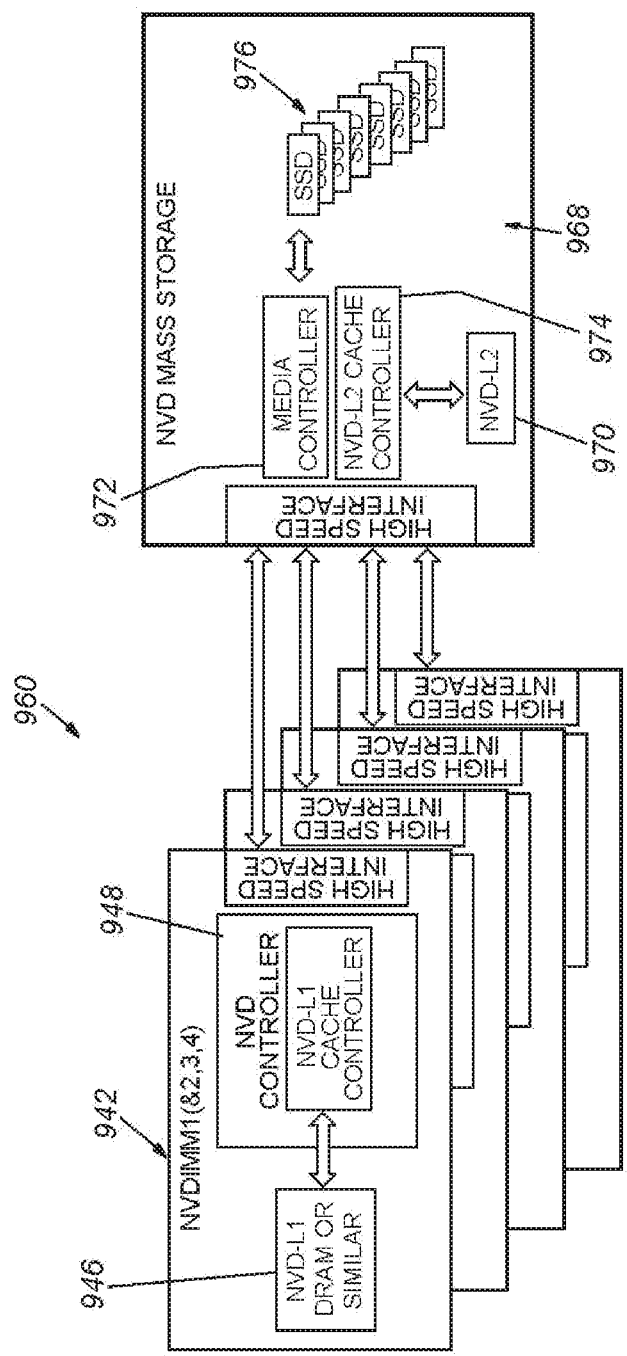
FIG. 9C is a block diagram showing a many-to-one NVDIMM arrangement for use in the memory-storage combine herein with the NVD-L2 cache placed in the NVD mass storage device and SSDs used as the building blocks for mass storage, according to an alternate embodiment.

In the arrangement 960 of FIG. 9C, a similar arrangement of NVDIMMs 942 to that of FIG. 9B are interconnected with a single NVD mass storage device 968. The NVD mass storage device 968 employs SSDs 976 as the storage building blocks in this embodiment, instead of storage media chips (956 in FIG. 9B). An NVD-L2 cache 970 is shown, along with controller 974 and media controller 972.

The NVD-L1 and NVD-L2 together form the multi-level extended cache, also referred to as "NVDIMM Cache (NVD-Cache)". The mapping of various system firmware components of the multi-level extended cache-storage combine described below is depicted in the arrangement 1000 of FIG. 10.

In the top layer or level 1002, customer software 1012, middleware 1014 and an NVDIMM memory-storage driver 1016 are executing in the host processor or host engines (co-processors, hardware accelerators, etc.) 1010. This layer 1002 communicates via discrete channels (Channel1-Channel4, in this example) with the middle layer 1004.

The middle layer/level 1004 consists of NVDIMM1-NVDIMM4 1020 on each respective channel (Channel1-Channel4) of the DDR memory bus 1021. The NVDIMM controller firmware 1022, NVD-L1 firmware 1024 and NVD-L2 firmware 1026 are each running on the NVDIMM 1020 as shown. Both NVD-L1 and NVD-L2 in each NVDIMM 1020 can be managed independently by associated NVD-L1 or NVD-L2 firmware, or in conjunction with relevant NVDIMM memory-storage drivers 1016 executing in the processor/host engines 1010.

The depicted bottom layer 1006 consists of NVD Mass Storage modules (A-D) 1040 interconnected by an appropriate bus architecture (for example, a PCIe bus implemented as a cable or optical link, or another equivalent interface). NVD mass storage firmware 1042 is shown running on the NVD mass storage and manages the mass storage media (data) 1044, as well as its interaction with NVDIMM components.

Figure 10:
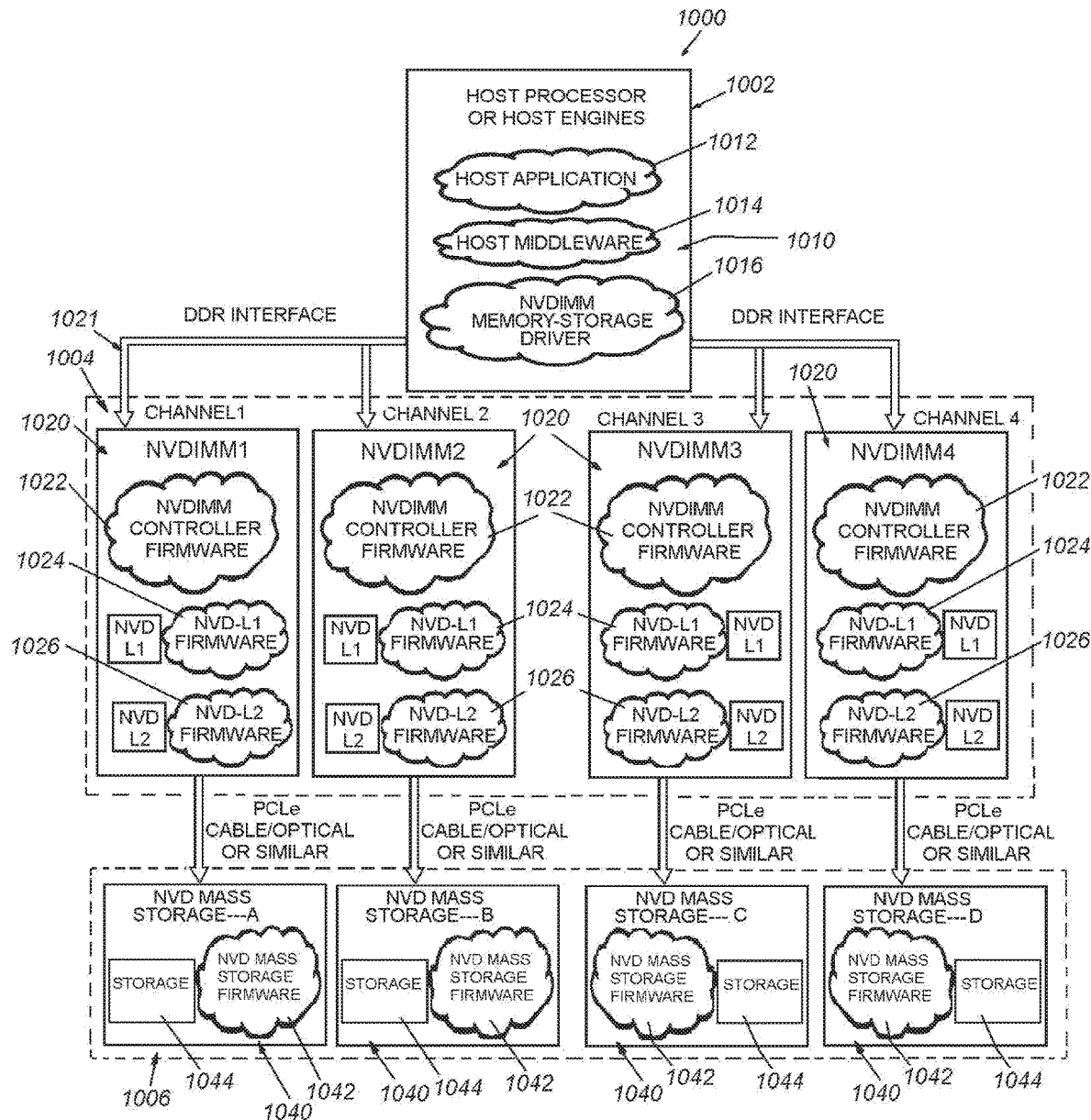
FIG. 10 is a block diagram of a memory-combine according to an embodiment herein with a one-to-one mapping.

In the exemplary arrangement 1000 of FIG. 10, the cache control can also be a mix of hardware and firmware. Similarly, hardware and firmware components listed below are together referred to as "NVDC Components", and can consist of the NVDIMM controller, the NVDIMM controller firmware, NVD-L1 controller, NVD-L1 firmware, NVD-L2 controller and NVD-L2 firmware. Note that in the exemplary embodiment of FIG. 10, one NVDIMM 1020 is populated on each DDR Channel (1-4) of memory bus 1021, and each of the NVDIMMs 1, 2, 3 & 4 are individually connected to a dedicated NVD mass storage device A, B, C and D, respectively, through a PCIe connection (or equivalent). Notably, the PCIe architecture and communication protocol is used as an example of interface that can be deployed, but any similar architecture/protocol providing high throughput can be used in alternate embodiments.

Figure 11:
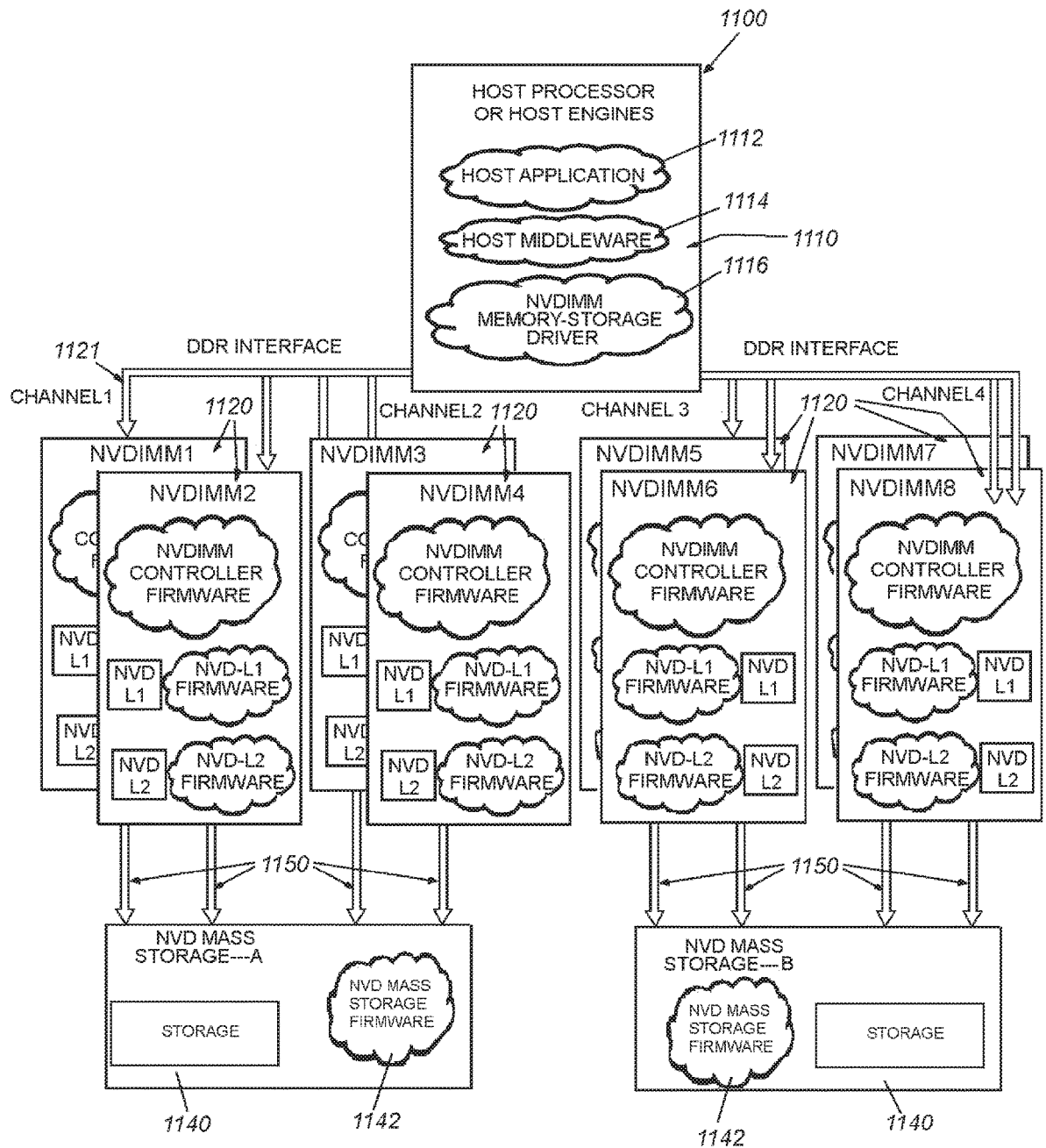
FIG. 11 is a block diagram of a memory-combine according to an embodiment herein with a many-to-one mapping.

FIG. 11 shows an arrangement 1100 according to another embodiment in which, multiple NVDIMMs are mapped to single NVD mass storage device. As in the exemplary arrangement 1000 of FIG. 10, customer software 1112, middleware 1114 and an NVDIMM memory-storage driver 1116 are executing in the host processor or host engines (co-processors, hardware accelerators, etc.) 1110. The DDR memory interface 1121 includes Channel1-Channel4 as shown, each interconnecting with a respective plurality of NVDIMMS (1120). Each NVDIMM is organized in accordance with the description of NVDIMM 1020 in FIG. 10 above. As shown in this exemplary arrangement, NVDIMM1 and NVDIMM2 (on DDR Channel 1) are mapped to NVD Mass Storage-A. Similarly, NVDIMM3 and NVDIMM4 (on DDR Channel 2) are mapped to NVD Mass Storage-A, creating a many-to-one mapping of NVDIMM (1120) to mass storage (1140), NVDIMM 5 and NVDIMM 6 (on DDR Channel 3) are, likewise, mapped to NVD Mass Storage-B in this example, and lastly, NVDIMM7 and NVDIMM8 (on DDR Channel 4) are also mapped to NVD Mass Storage-B. Interface 1150 links each NVDIMM 1020 with the mass storage device 1140. In an alternate embodiment, each NVDIMM pair (NVDIMM1 and 2, NVDIMM3 and 4, NVDIMM5 and 6, and NVDIMM7 and 8) can be linked to a respective, discrete mass storage device—for example Mass Storage A-D as described with reference to the arrangement 1000 of FIG. 10.

In the exemplary arrangement 1100 of FIG. 11, the NVDIMM memory-storage driver 1116 is responsible for maintaining the locational information of content in all the NVDIMM caches, NVD-L1, NVD-L2 (in each NVDIMM module 1120), and their eventual place in the NVD mass storage device(s). The System will automatically detect the NVDIMM's location and populates the data relevant for that position. Based on relative position of the NVDIMM 1120, the same position can be reconstructed in the NVD mass storage firmware 1142. Note that all the data entering the NVDIMM 1120 and NVD mass storage 1140 is routed through the memory bus 1121.

Figure 1:
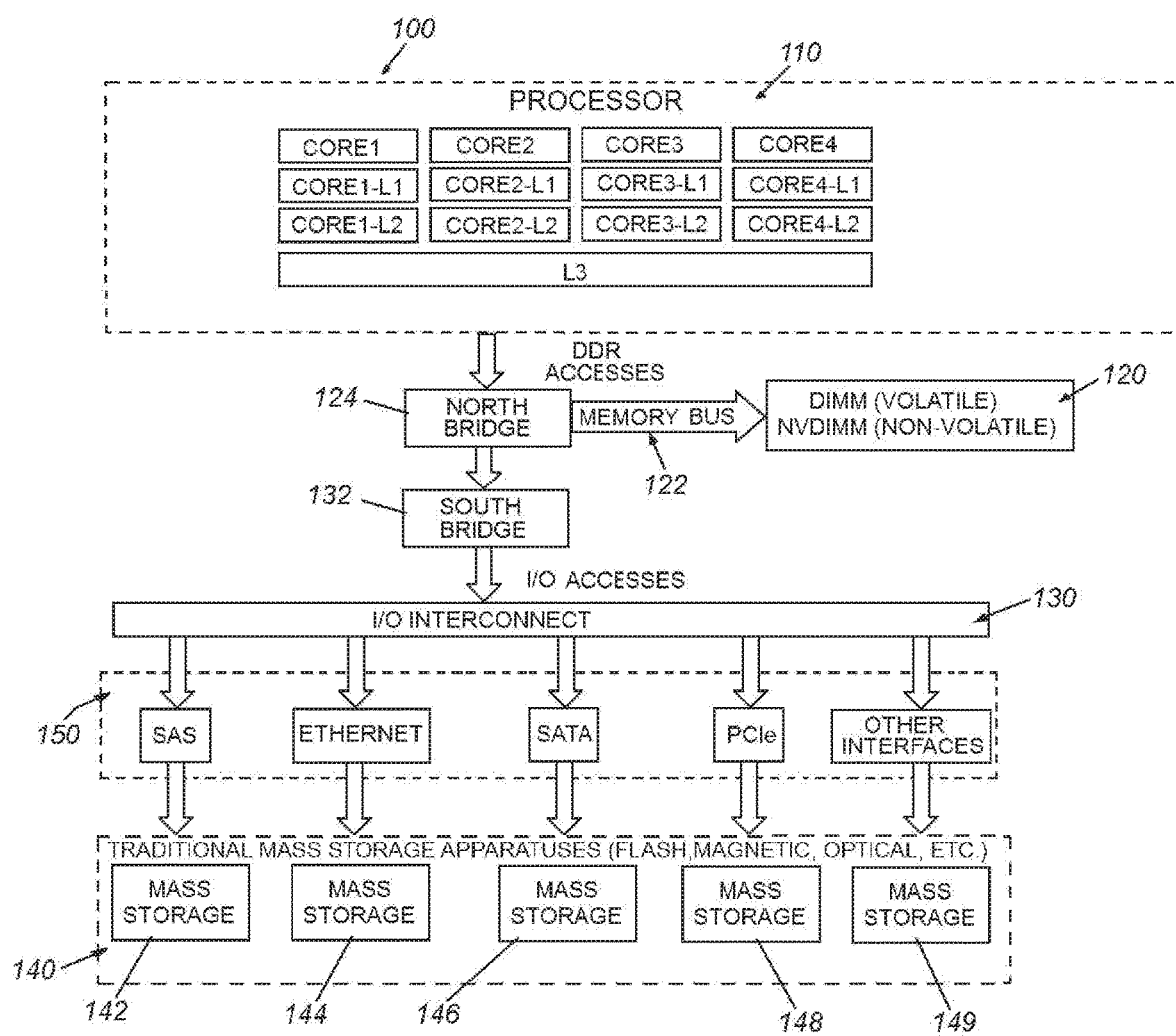
FIG. 1 is a block diagram of a traditional/conventional computing system, such as that found in a server environment with (e.g.) DRAM memory accessible through a North Bridge and memory bus and data storage (e.g. disks, electro-optical SSDs) accessible through a South Bridge, according to a prior art implementation.
Figure 12A:
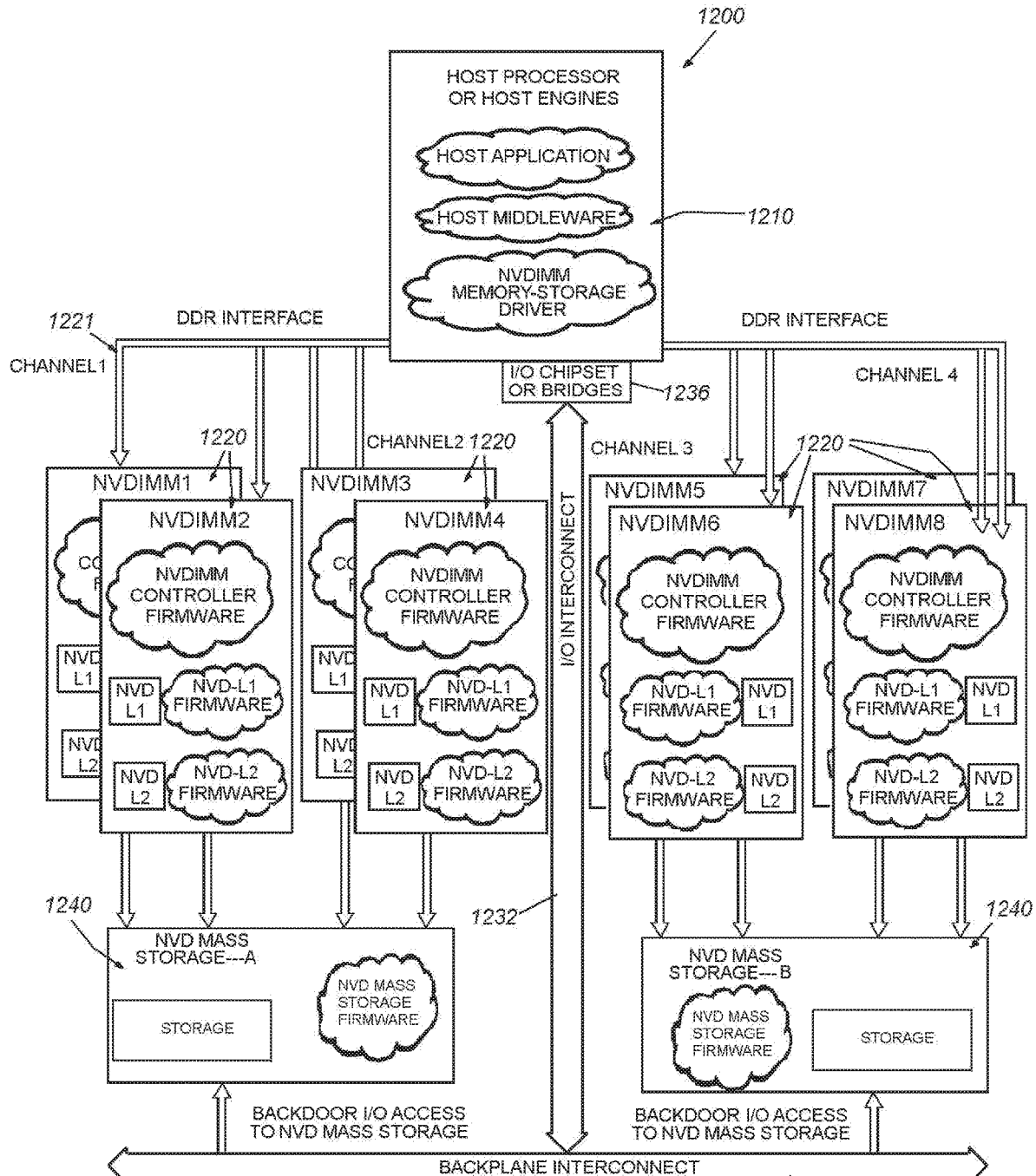
FIG. 12A is a block diagram of a memory-combine according to an embodiment herein with a many-to-one mapping in which the processor is interconnected to NVD mass storage as well as to the external world (e.g. through Ethernet) through the backdoor I/O access connections of NVD Mass Storage devices and via the I/O interconnect.

Conversely, FIG. 12A depicts an arrangement 1200 in which the NVD mass storage device 1240 is connected to the system's I/O interconnect 1230 as well as the memory bus 1221. In this arrangement 1200, NVD mass storage 1240 can be accessed by the processor or host engines 1210 (as generally described above in FIGS. 10 and 11) directly through I/O interconnect 1230, or indirectly through the memory bus 1221. As depicted, the I/O Interconnect 1230 links via a bus branch 1232 with an I/O chipset and/or bridges 1236 associated with the processor or host engines 1210. Hence, the I/O interconnect 1230 and associated chipset/bridge 1236 provides backdoor access to the mass storage device arrangement 1240 (bypassing the NVDIMMs 1220 in the middle layer) in a manner that is similar to a conventional, bifurcated memory and storage implementation (as shown for example in FIG. 1).

Figure 12B:
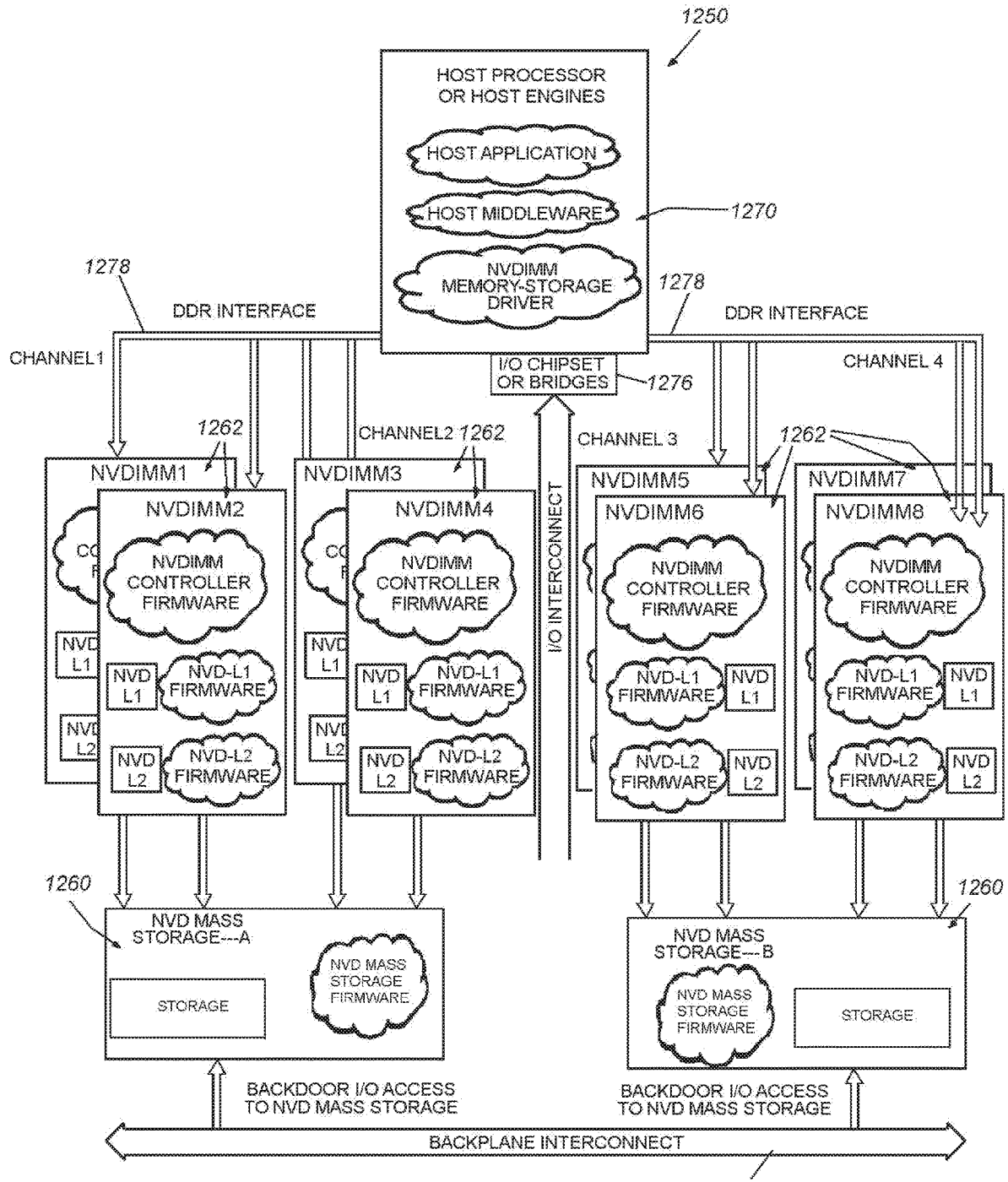
FIG. 12B is a block diagram of a memory-combine according to an embodiment herein with a many-to-one mapping in which the processor is interconnected to NVD Mass Storage as well as to the external world exclusively through NVDIMMs and their backdoor I/O access connections and is free of direct connections to access data in internal or external Mass Storage.

Alternatively, in the illustrative arrangement 1250 of FIG. 12B, the NVD mass storage 1260 is accessed by the processor or host engine 1270 exclusively through NVDIMMs 1262. The I/O chipset (if available) 1276 is free to handle other functions that are not directly related to data movement. Thus, the processor/host 1270 uses DDR Interface 1278, NVDIMM or plurality of NVDIMMs 1262, single or plurality of NVD Mass Storage devices 1260 to reach any external feeds or storage devices through a backplane interconnect 1280 without using the I/O chipset 1276.

II. I/O Access to NVD Mass Storage and NVDIMM Optimized Flow

Figure 13:
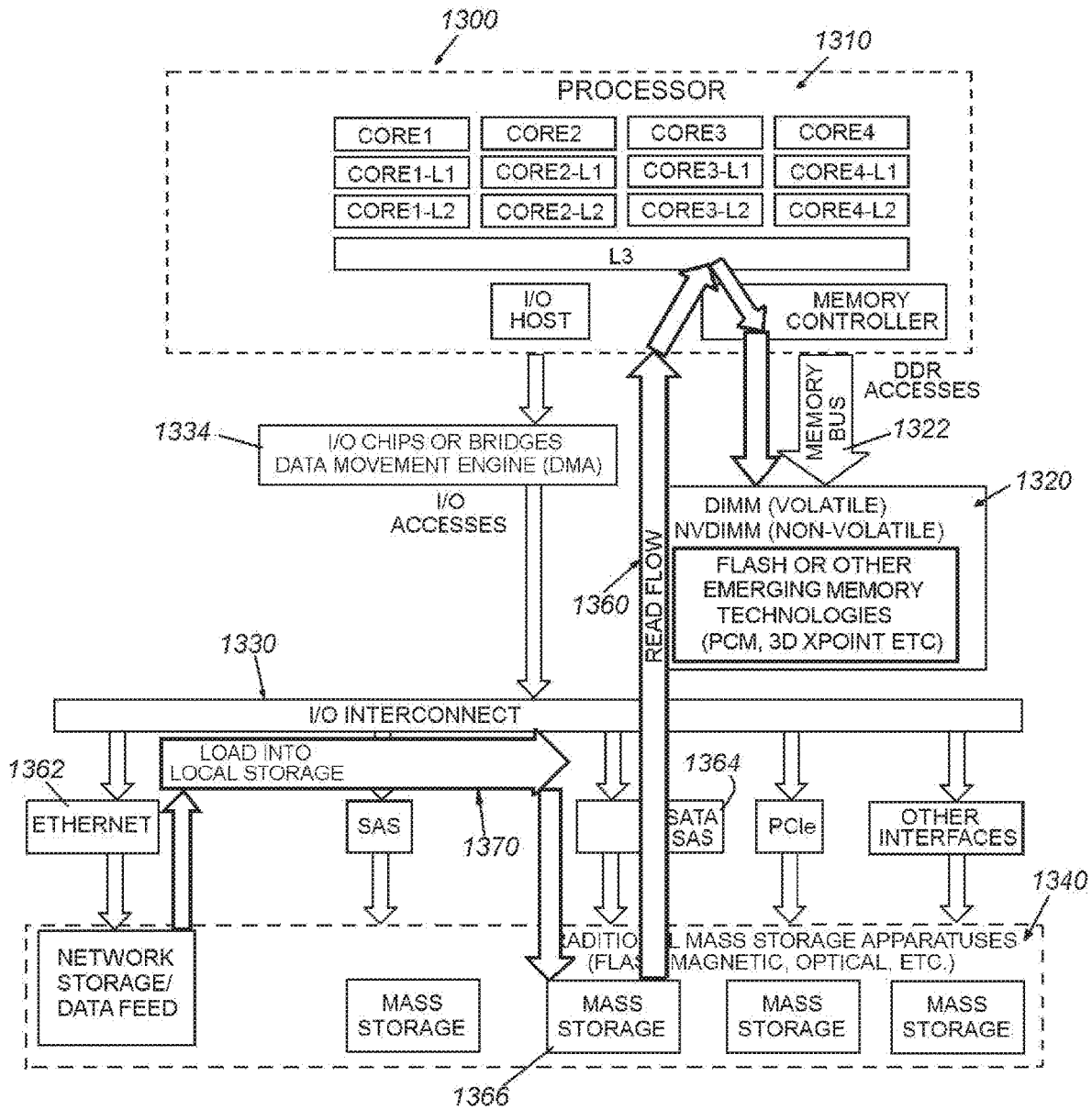
FIG. 13 is a block diagram of a computing system with a memory-storage combine, showing data movement to mass storage through Ethernet and Read dataflow in NVDIMMs of the memory-storage combine, according to a conventional (traditional) dataflow implementation.

In the traditional data flow arrangement 1300 shown in FIG. 13 (similar to the computing arrangement 200 of FIG. 2, described above), the processor 1310, or similar data movement engines (e.g. Remote Data Movement Engine or RDMA), are responsible for moving the data from mass storage 1340 to the DIMM or NVDIMM 1320 and vice versa through the processor 1310 and its memory interface 1322. Note that the memory module 1320 can include DRAM, SRAM, Flash, or any other appropriate memory technology. By way of non-limiting example, this can even include emerging memory technologies, such as phase-change memory (PCM), 3D XPoint™, and the like. Processor(s) 1310 access the mass storage devices 1340 through the I/O chipset 1334, or other similar arrangement(s) (e, g, movement engines, such as direct memory access (RDMA), etc.), which provide access to external networks, external mass storage device(s), as well as internal mass storage devices of the computing system (for example, a server environment) over the I/O interconnect 1330.

Figure 14:
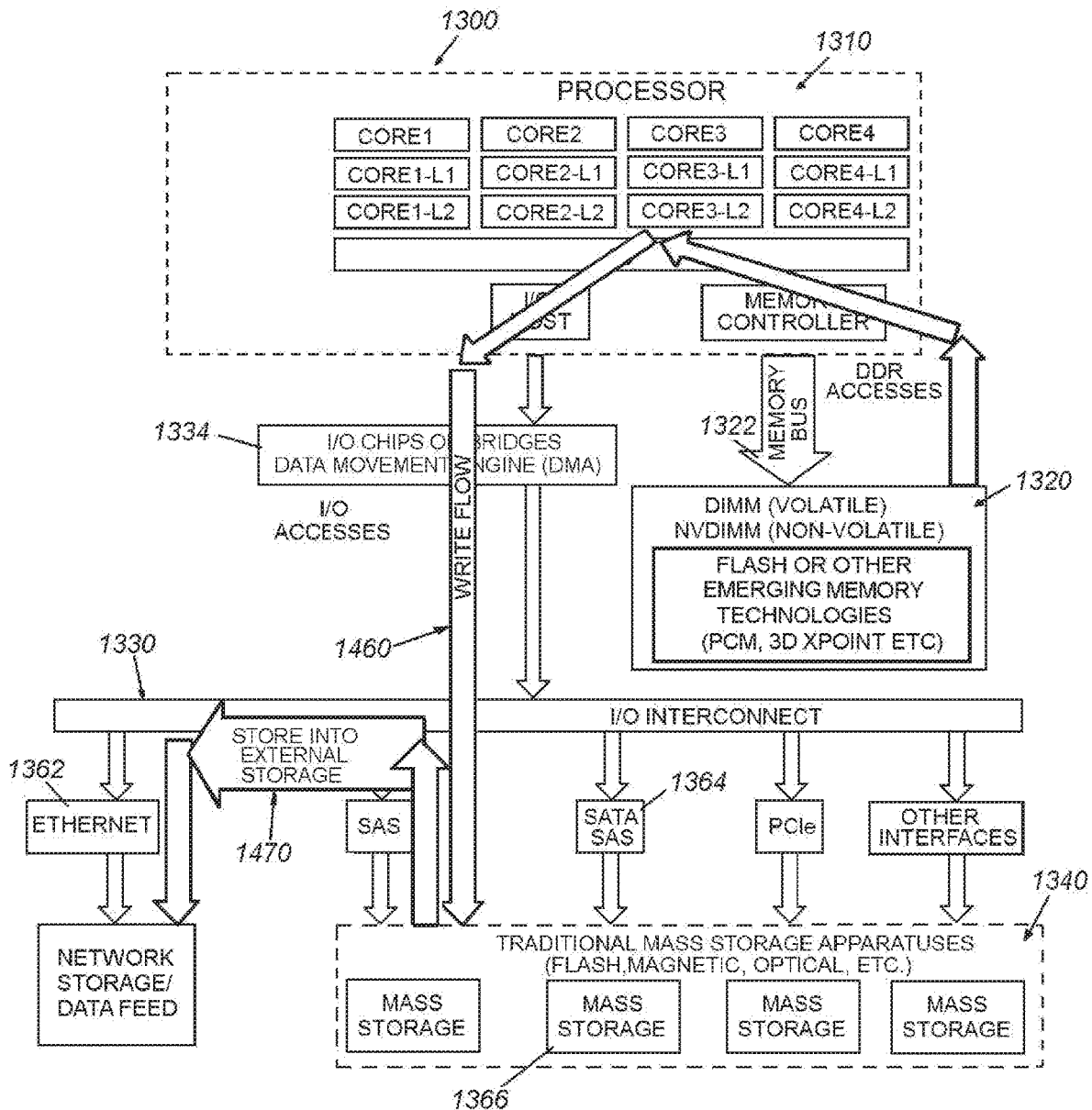
FIG. 14 is a block diagram of the computing system with the memory-storage combine of FIG. 13, showing data movement through Ethernet from mass storage and Write dataflow in NVDIMMs of the memory-storage combine according to a conventional (traditional) dataflow implementation.

By way of example in the depicted "Read Flow" path 1360, external data is moved through Ethernet 1362, and is placed in the internal SATA (1364) based mass storage device 1366 (shown as load into local storage path 1370). The processor 1310 then "reads" the data through the I/O interconnect 1330, and places it in the NVDIMM 1320 when needed. Note that in an alternate method, data through Ethernet 1362 can directly be placed in DIMM/NVDIMM 1320. Similarly, in "Write Flow" path 1460 for the same arrangement 1300, as depicted in FIG. 14, the processor 1310 access the data from DIMM/NVDIMM 1320, and writes onto the internal SATA 1364 based traditional mass storage device 1366. The data is then moved out of the traditional mass storage device 1366 through Ethernet port as needed along a path 1470. As in "Read Flow", even in "Write Flow", data can directly be moved from DIMM/NVDIMM 1320 to external network through Ethernet port 1362 through the processor 1310 and its memory interface 1322. The use of the processor 1310 to populate the DIMM/NVDIMM 1320, thus incurs heavy processing overhead penalty. In addition, the memory bus 1322 is occupied as the data is moved in and out of the DIMM/NVDIMM, thus blocking other processes or threads running on the processor 1310 from accessing the memory bus 1322 during this read or write interval. By way of example, where NVDIMMs can contain storage capacity of several hundred gigabytes, transfer of data in and out of NVDIMM can potentially block operations along the memory bus for a significant amount of time. This essentially creates a choke point in an otherwise fast and highly efficient processing arrangement.

The illustrative system of the exemplary embodiment extends the NVDIMM memory-storage combine described above by providing a backdoor I/O access to the NVD mass storage device. This avoids the usage of memory bus for moving data in and out of NVDIMM. This novel technique of moving data is referred to herein as "NVD Read Flow" and "NVD Write Flow", and is described further below.

Figure 15:
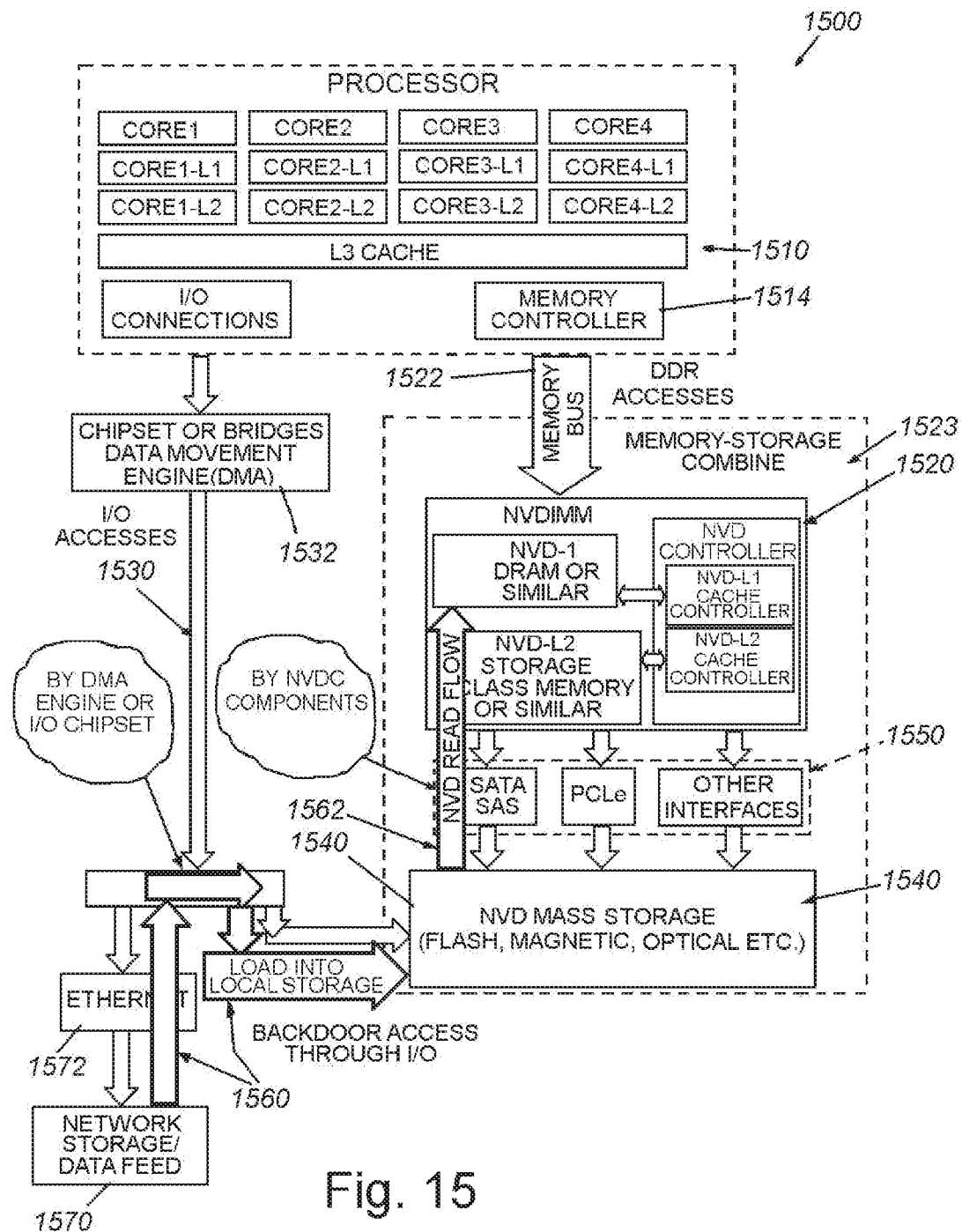
FIG. 15 is a block diagram of a computing system with a memory-storage combine according to an exemplary embodiment, showing NVD Read dataflow to NVD mass Storage or other NVD tiers (NVD-L1 or NVD-L2 or both) through Ethernet, and backdoor access.

FIG. 15 shows a diagram of an exemplary computing arrangement 1500 with a data flow employing the above-described "NVD Read Flow" and "NVD Write Flow" so that the data movement to DRAM memory on NVDIMM 1520 does not pass through memory bus 1522. As shown by the solid arrows 1560, 1562, the data can be moved directly into the NVD mass storage device 1540, instead of internal SATA based mass storage device (1340) shown in FIG. 13. Subsequently, as shown in FIG. 15, for "NVD Read Flow", the components of the NVDC memory-storage combine 1523 can read (arrow 1562) the data from NVD mass storage 1540 into either NVD-L1 (e.g. DRAM) or NVD-L2 (Storage Class memory, or equivalent) in the NVDIMM module 1520, or both as appropriate (via communication architectures/protocols 1550), with no involvement of the memory controller 1514 or memory bus 1522. Note that the data can also be moved in on transfer all the way to the NVD-L2 or NVD-L1 as needed.

Notably, the NVD mass storage device 1540 in this illustrative arrangement 1500 can be accessed either on the I/O interconnect 1530 (using the I/O chipset and bridges 1532) or on the memory bus 1522 (through Extended Cache of the NVDIMM). As shown, the data from a network storage or data feed 1570 can be loaded (arrow 1560) into the NVD mass storage device 1540 over the backdoor pathway, which can include Ethernet 1572, under control of the I/O Chipset 1532, RDMA engine, etc.

Figure 16:
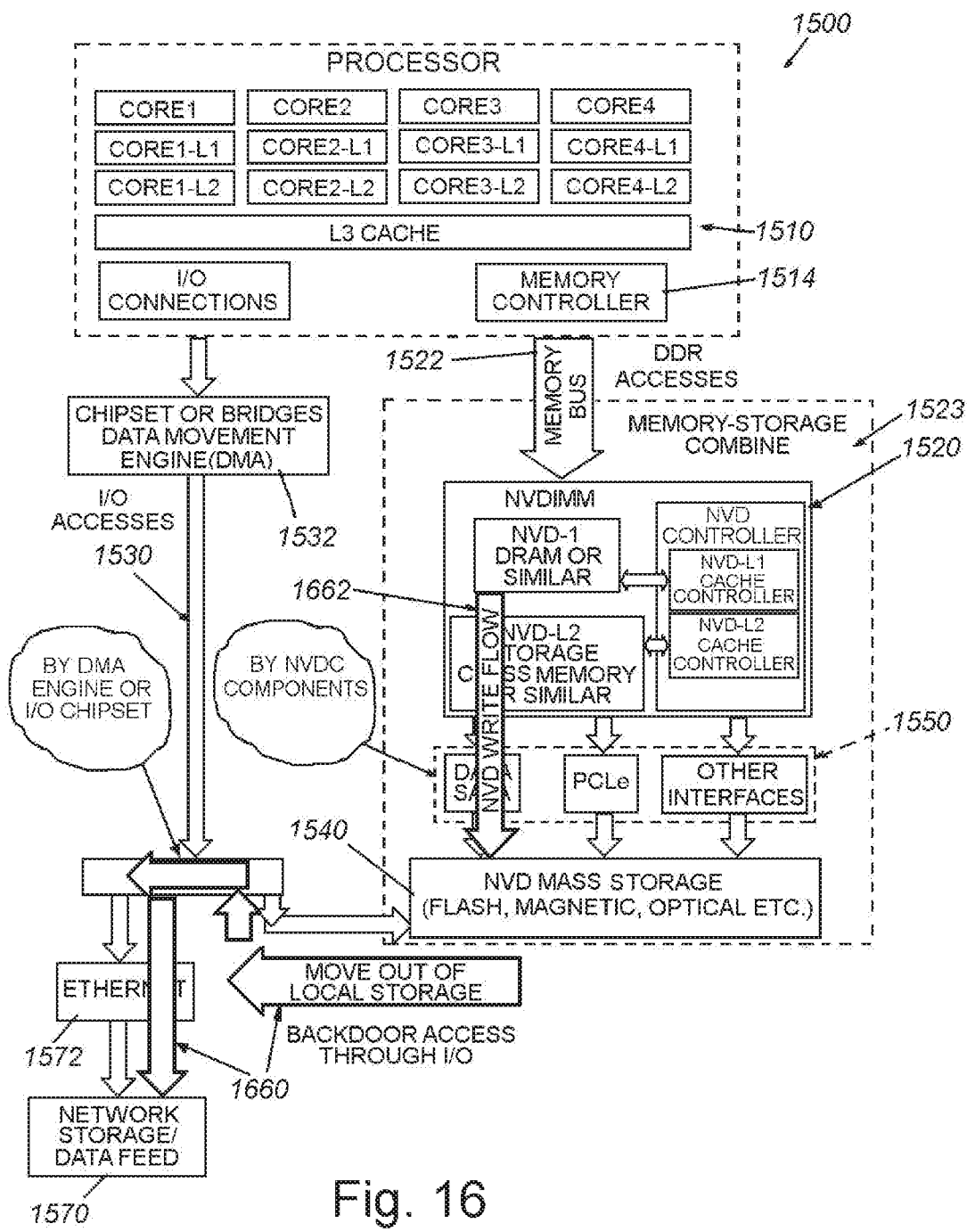
FIG. 16 is a block diagram of a computing system with the memory-storage combine of FIG. 15, showing NVD Write dataflow from NVD mass storage or other NVD tiers (NVD-L1 or NVD-L2 or both) going through backdoor access and Ethernet.

FIG. 16 shows the "NVD Write flow" with reference to the exemplary computing arrangement 1500 of FIG. 15. In this flow, NVDC components are responsible for moving data (arrow 1662) between NVD-L1, NVD-L2 and NVD Mass Storage device 1540. Subsequently, any of the DMA engines on the I/O chipset or processor in a different server (not shown) can move the data from the NVD mass storage device 1540 to another server (arrow 1660) via (e.g.) Ethernet 1570. Note that the data can also be moved from NVD-L1 or NVD-L2 directly to the network storage 1570 through Ethernet 1572. Note that the data flow methods described with reference to FIG. 15 can support the conventional data flows described with reference to FIGS. 13 and 14.

The address space of the memory-storage combine 1523 in the arrangement 1500 of FIGS. 15 and 16 is defined so that the Application essentially "sees" the entire storage environment as a large memory space and utilizes it as such during operations by the application.

In embodiments where other internal mass storage devices are available on the I/O interconnect 1530 along with NVD mass storage 1540, data can be moved to them as appropriate in a manner that is free of use of the memory bus 1522. Such methods enable the processor 1510 to offload management of all data transfer between NVD-L1, NVD-L2 and NVD mass storage device 1540 to the NVDC Components (1523). Similarly, all data transfer between NVD mass storage and other storage elements is offloaded to I/O chipset or other DMA Engines 1532, thus freeing up resources of the processor 1510 and its memory bus 1522. This arrangement, thus provides significant performance advantages over a conventional implementation, and also enables two discrete pathways between the system's storage and networked data sources.

Figure 17:
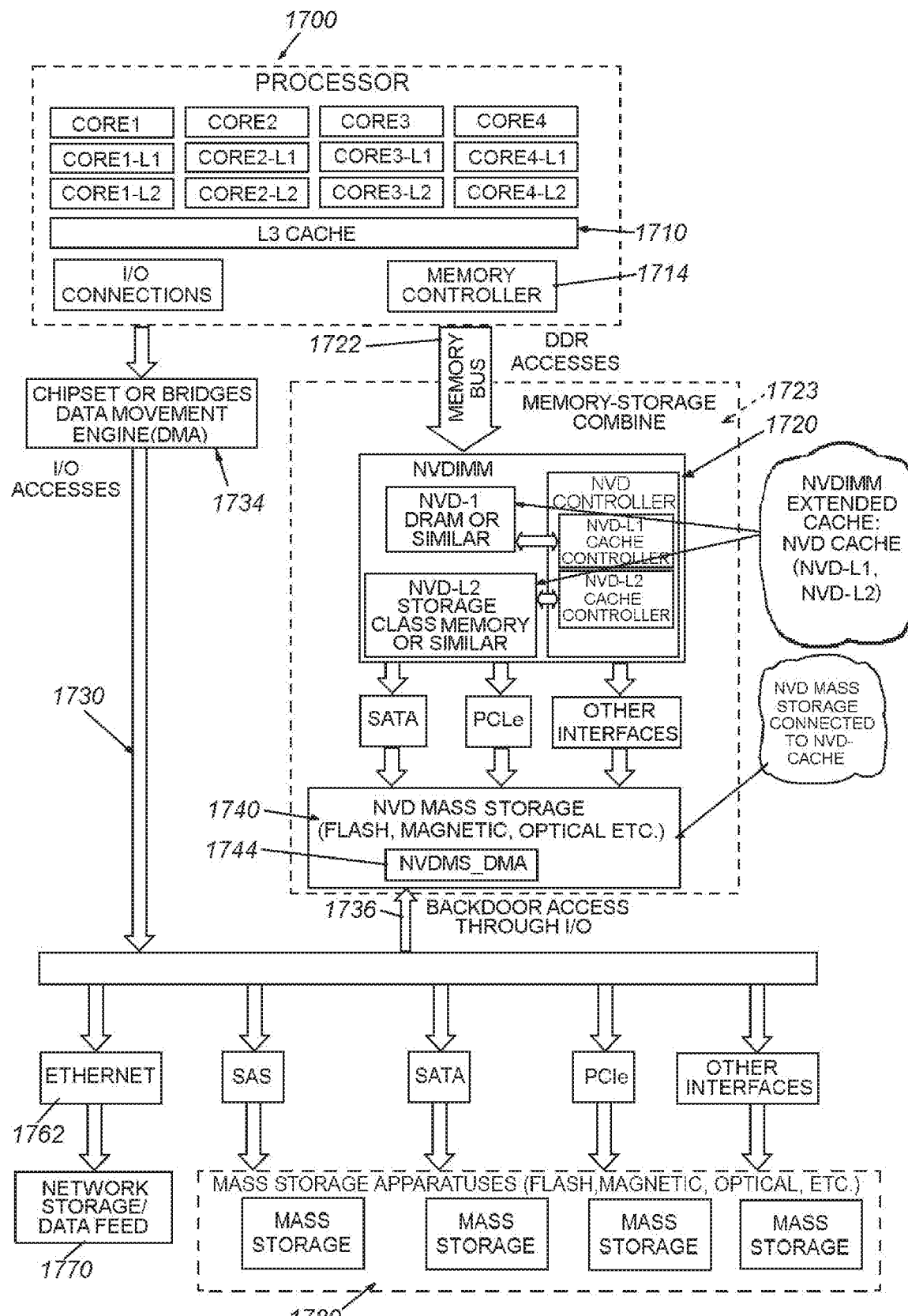
FIG. 17 is a block diagram of a computing system with a memory-storage combine according to an exemplary embodiment, showing backdoor access to NVD mass storage over the I/O interconnect.

In the arrangement 1700 of FIG. 17 the I/O connections and I/O chipset 1734 are freed from significant processing overhead. The computing arrangement 1700 includes both traditional mass storage device 1740 and an NVD mass storage device 1780 in accordance with embodiments herein. The traditional mass storage 1780 is connected to the processor 1710, and has no (is free of any) direct path to the NVDIMM in the memory storage combine 1723. Conversely, in this embodiment, mass storage 1780 connects to the processor 1710 directly through I/O interconnect 1730 and associated chipset 1734.

Conversely, in the arrangement 1700 of FIG. 17, the NVD mass storage device 1740 is connected to the processor 1710 through the I/O interconnect 1730 (via the backdoor 1736), as well as the memory bus 1722 using the controller 1714. The embodiment also shows that the NVD mass storage 1740 includes an NVDIMM mass storage data movement engine (NVDMS-DMA) 1744. As such, the data movement into either mass storage device 1780 or NVD mass storage device 1740 connected to the I/O interconnect 1730 can be managed by DMA engine in I/O chipset 1734 or other DMA engines with access to I/O interconnect 1730. In this embodiment however the NVDMS-DMA 1744 can be used to move data from NVD mass storage 1740 to the traditional mass storage 1780, and vice versa. In another exemplary embodiment, the NVDMS-DMA 1744 can also be configured to move data from NVD mass storage device 1740 to a location 1770 external to the computing arrangement (server) 1700, or vice versa, via (e.g.) Ethernet 1762

Figure 18A:
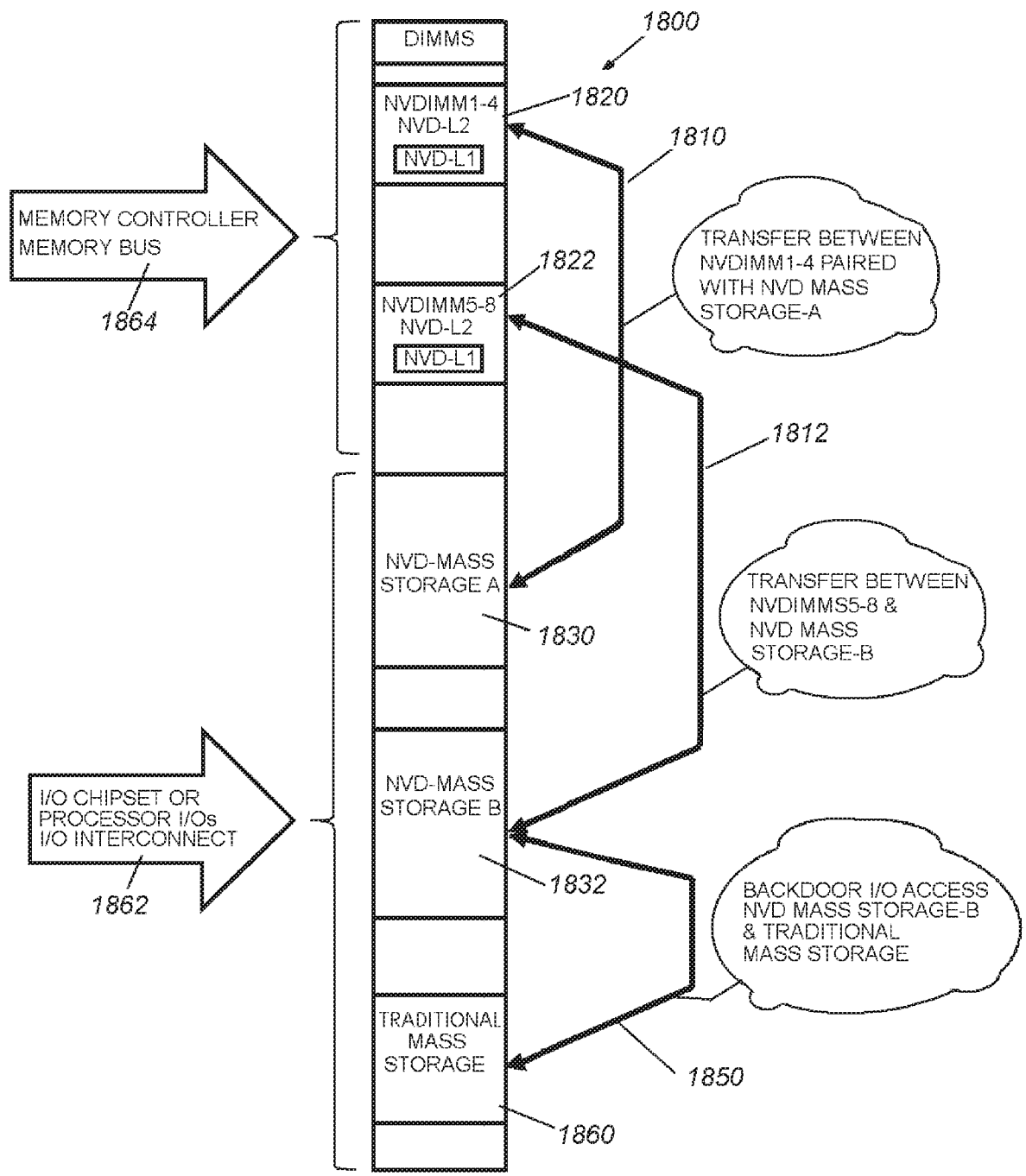
FIG. 18A is a diagram of a consolidated memory map of addressable regions of the computing system with memory-storage combine according to an exemplary embodiment, depicting interleaving and backdoor access, where NVDIMMs and NVD mass storage are separately addressable on the memory map.

The advantages provided by of the above-described exemplary embodiments can be further shown through a memory view of the processor as represented by the memory map 1800 of FIG. 18A. This map 1800 is the consolidated view of all the addressable areas in the processor arrangement directly or indirectly. According to the system and method herein, every (or substantially all) addressable location (or virtual logical addresses) can be mapped to various components or devices within the overall interconnected arrangement. The memory map 1800 thereby depicts the possible mapping of various devices connected to the processor. The arrangement of the illustrative system and method (in its various embodiments) allows data movement (bridging arrows 1810 and 1812) between the NVDIMM memories 1820, 1822, and either NVD mass storage (AB) 1830, 1832 through the NVD private connection. It also allows data movement (bridging arrow 1850) between NVD mass storage (e.g. B) 1832 and traditional mass storage 1860 through the I/O interconnect 1862.

The embodiment in FIG. 18A shows that all NVDIMMs (1-4) on Channel1 are treated as one unit 1820 (for example, through a technique or method of memory interleaving known to those of skill), while NVDIMMs (5-8) on 2 are treated as another unit 1822, all under connection and control of the memory controller and bus 1864. Note that the NVD-L2 can be shared between all the NVDIMMs (1-4) and can be placed in the NVD mass storage. This is further described in FIG. 28 below.

Figure 18B:
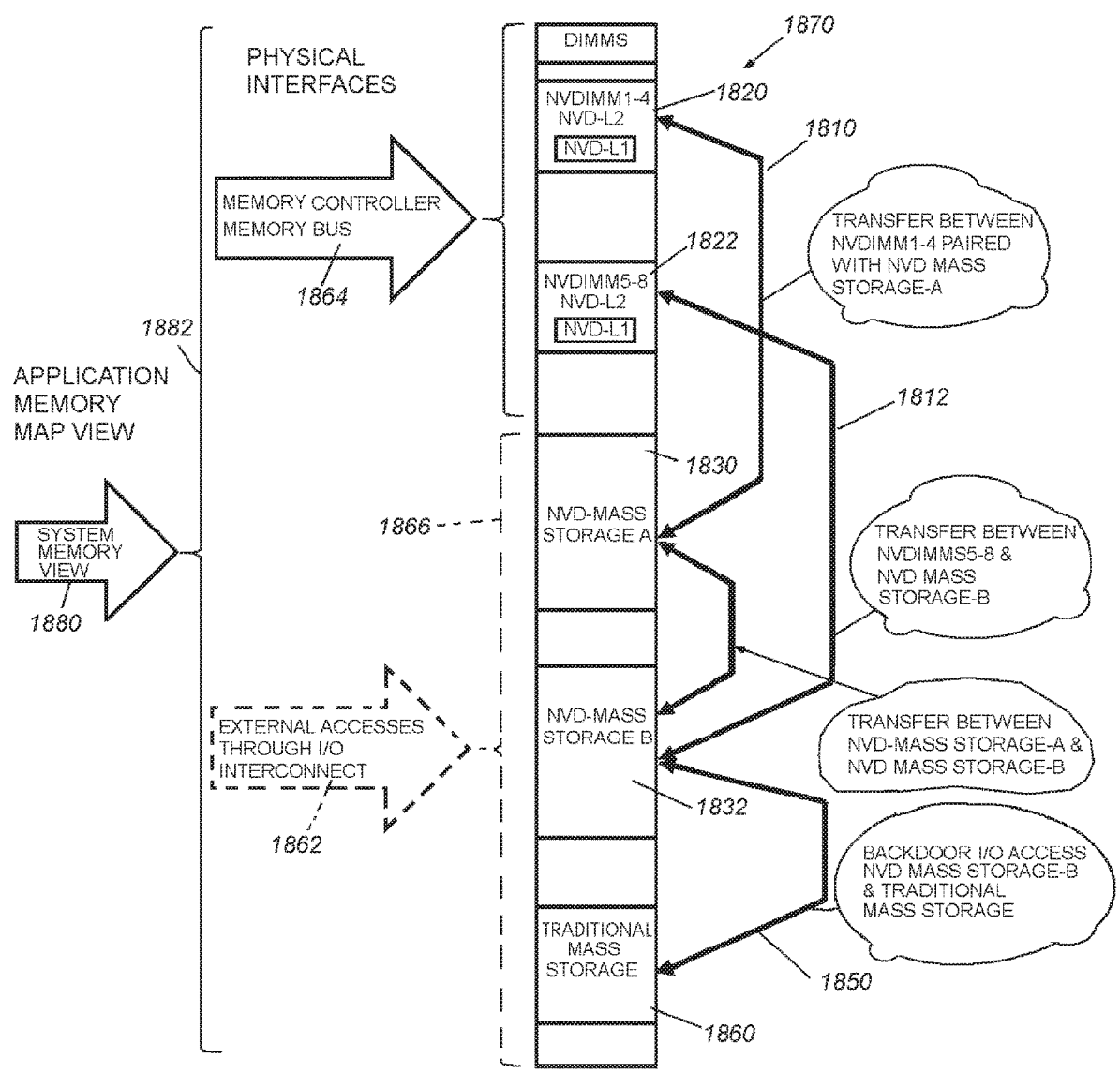
FIG. 18B is a diagram of a consolidated memory map of addressable regions of the computing system with memory-storage combine according to another exemplary embodiment in which I/O interconnect is optional and NVD mass storage is addressable on Memory map with NVDIMMs on memory bus acting as a buffer or a cache.

In FIG. 18B the arrangement 1870 the collection of NVDIMMs (1-4) 1820 and (5-8) 1822 are directly accessible on the memory bus 1864 as two or more groups, while mass storage elements (A, B & traditional storage) 1830, 1832 and 1860 are hidden behind the NVDIMMs. Mass storage is not directly accessible; however, data can be moved between NVDIMMs and mass storage apparatus through the backdoor interface (bridging arrow 1850). Thus the application can still access the NVD Mass Storage A 1830, Mass Storage B 1832 and traditional mass storage 1860 through the memory controller bus interface 1864. In terms of addressability in the memory map, in one arrangement, NVD-L1, NVD-L2 or both of the NVDIMM groups 1820 and 1822 can be directly addressable on the Application Memory Map View 1880 through memory bus 1864 resembling a traditional memory space in the memory map while the NVD Mass Storage A, B 1832 and 1860 are indirectly addressed on the Application Memory Map View 1880.

In another arrangement, the NVD-L1, NVD-L2 or both of the NVDIMM groups 1820 and 1822 can form a cache or buffer for the NVD mass storage 1820, 1832, and so are not directly addressable in the Application Memory Map view 1880. Instead only the NVD Mass Storage A and B 1832 and 1832, respectively, and traditional mass storage 1860 appear on the depicted Application Memory Map View 1880. Note that application can optionally access these mass storage devices 1830, 1832, 1860 through the I/O interconnect 1862 (now shown in phantom), even though such operation is not required to achieve functionality. The dashed bracket 1866 in FIG. 18B also indicates that external devices (e.g. RDMA) can directly access the Mass Storage A 1830, Mass Storage B 1832 and traditional mass storage 1860. These devices can also access content in NVDIMM1-4 (1820) and NVDIMM5-8 (1822) through the backdoor interfaces (bridging arrow 1850). Note that the arrow 1880 and bracket

1882 over the entire arrangement represents the system memory view, encompassing the entire NVDIMM and storage combination.

Figure 19A:
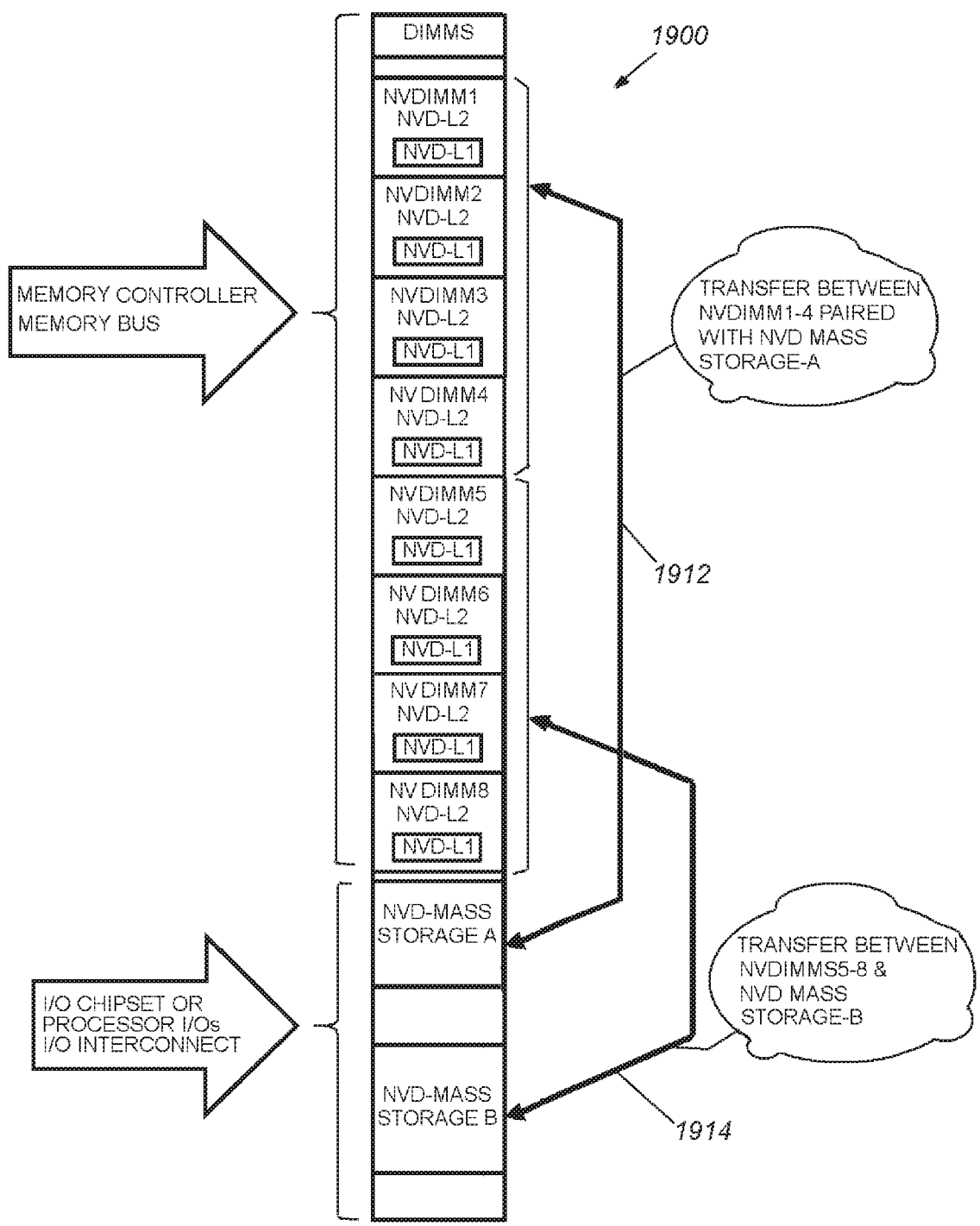
FIG. 19A is a diagram of a consolidated memory map of addressable regions of the computing system with memory-storage combine according to an exemplary embodiment, depicting NVDIMMs separately paired with NVD mass storage, where NVDIMMs and NVD mass storage are separately addressable on the memory map.

Similarly, FIG. 19A shows an example of a consolidated memory map 1900 when NVDIMMs are not interleaved (i.e. free of interleaving). Similar to the depicted map 1800 of FIG. 18, data movement between NVDIMMs 1920 and NVD mass storage devices 1940 can be accomplished through the NVD private connection(s) as shown and described herein. More particularly NVDIMM1-4 are shown transferring data (bridging arrow 1912) to NVD Mass Storage A and NVDIMM5-8 transfer data (bridging arrow 1914) to NVD Mass Storage B. It is contemplated that other data transfer arrangements can be implemented between groupings of NVDIMMs, NVD mass storage and/or traditional mass storage as appropriate to the needs of the processing environment.

Figure 19B:
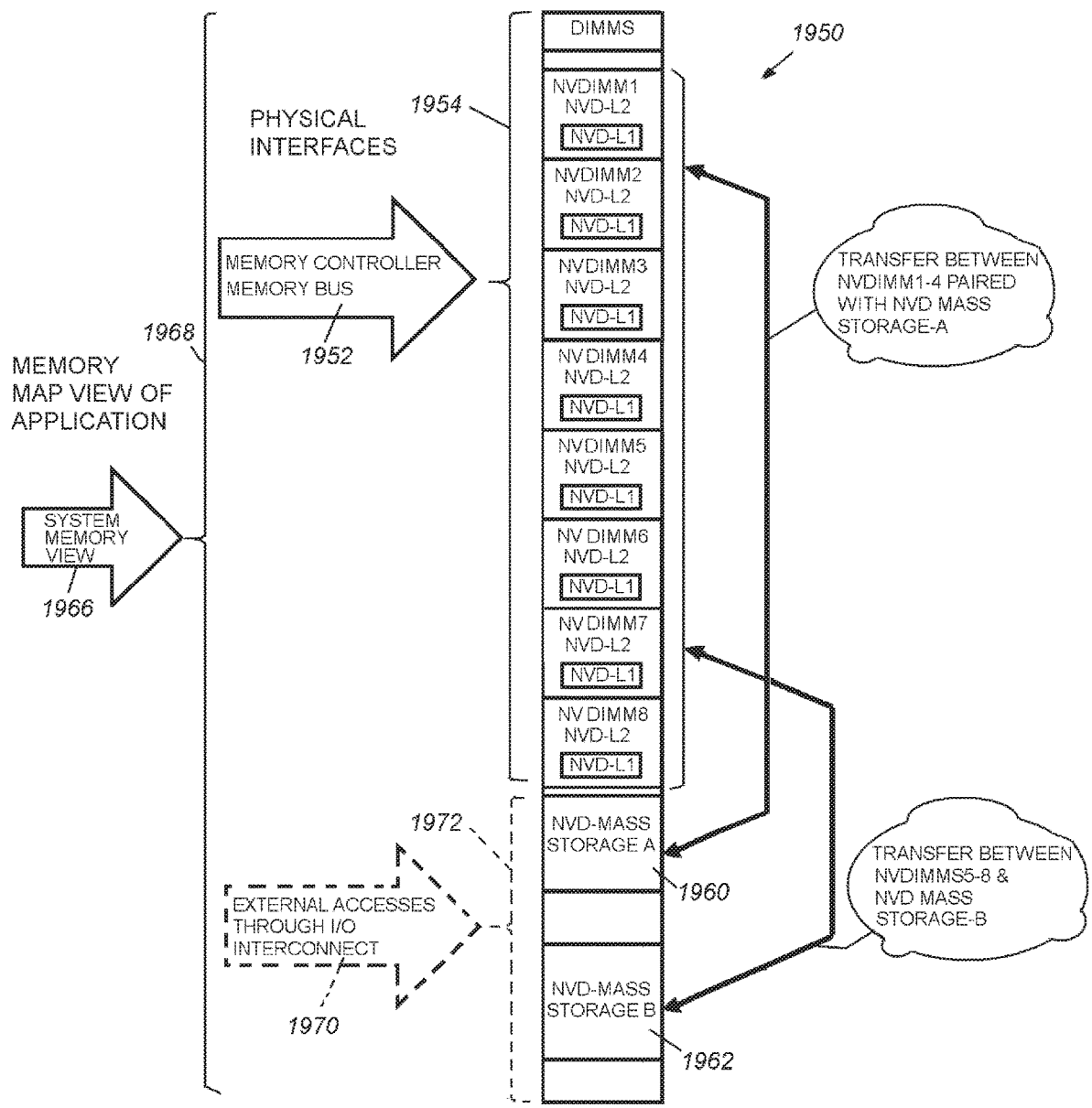
FIG. 19B is a diagram of a consolidated memory map of addressable regions of the computing system with memory-storage combine according to another exemplary embodiment, in which I/O interconnect is optional and NVD mass storage is addressable on memory map with NVDIMMs on memory bus acting as a buffer or a cache.

FIG. 19B shows an exemplary arrangement 1950 in which each NVDIMM from the collection of NVDIMM1 through NVDIMM8 1954 is directly accessible on the memory bus 1952 individually, while mass storage elements (Mass Storage A 1960, Mass Storage B 1962 and traditional storage (not shown)) are hidden behind the NVDIMMs 1954, as indicated by the memory view (arrow 1966 and bracket 1968). Mass storage 1960, 1962 is not directly accessible (free of direct access); however, data can be moved between NVDIMMs 1954 and mass storage device 1960, 1962 through the backdoor interface. Thus, an application can still access the NVD Mass Storage A 1960, Mass Storage B 1962 and traditional mass storage (if any) through the memory controller bus interface 1952. The addressability aspects described in FIG. 18B apply to the embodiment shown in FIG. 19B. Optionally, an application can access these mass storage devices through the I/O interconnect 1970 (shown in phantom), even though it is not required. The dashed bracket 1972 indicates that external devices (e.g. RDMA) can directly access the Mass Storage A 1960, Mass Storage B 1962 and traditional mass storage (if any). These devices can also access the content in NVDIMM1-NVDIMM8 1954 through backdoor interfaces.

Figure 19C:
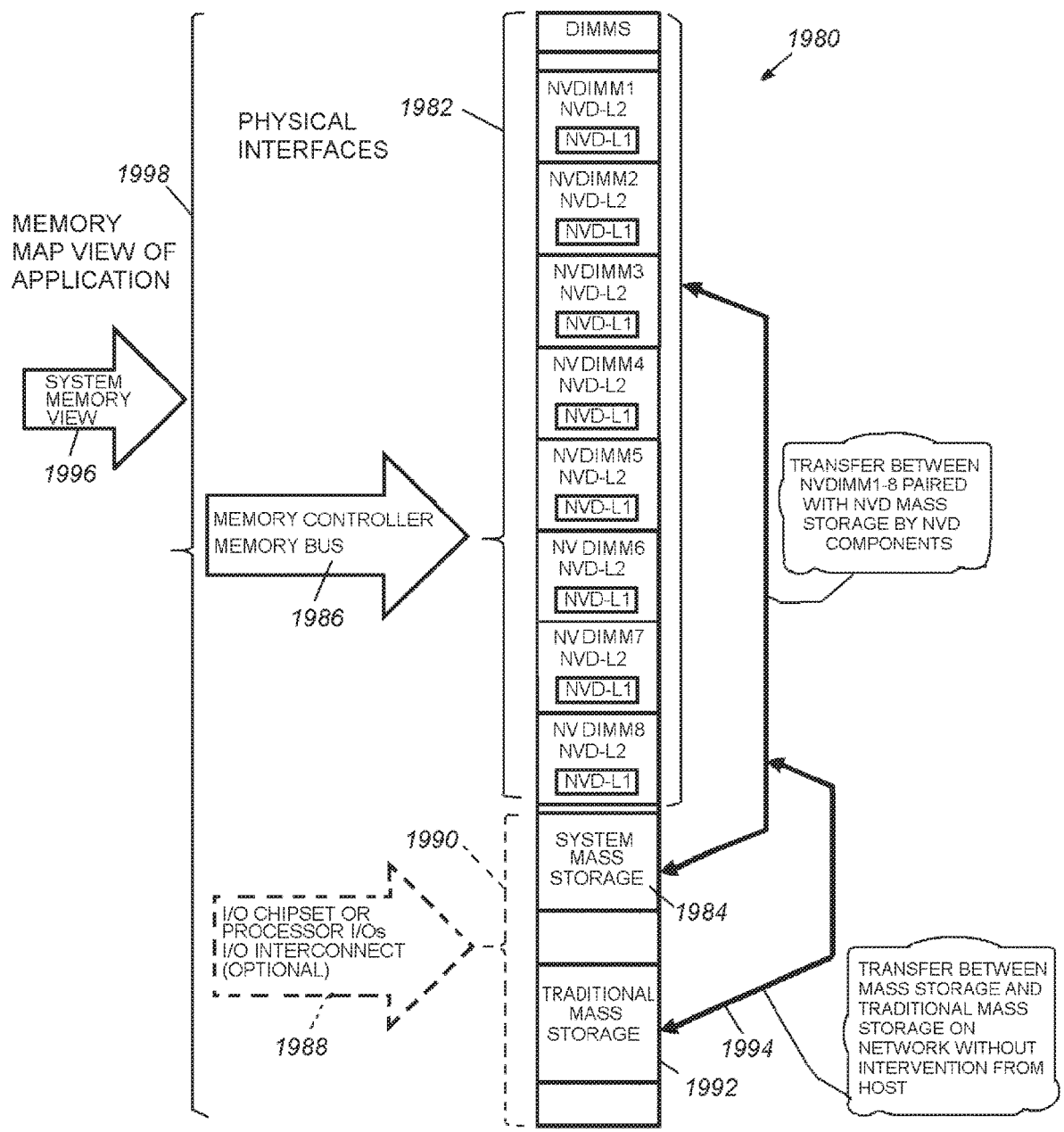
FIG. 19C is a diagram of a consolidated memory map of addressable regions of the computing system with memory-storage combine according to another exemplary embodiment, in which a single NVD Mass Storage apparatus is addressable on the memory map with NVDIMMs on Memory Bus acting as a buffer or a cache.

The exemplary arrangement 1980 of FIG. 19C provides a further embodiment in which all the NVDIMMs as well as the system mass storage 1984 are accessible directly on the memory controller bus 1986. While a single system mass storage device is depicted, it is expressly contemplated that two or more mass storage devices can be provided, in a manner similar to FIGS. 18A, 18B, 19A and/or 19B. Optionally, an application can optionally access the mass storage device(s) through the I/O interconnect 1988 (shown in phantom). The dashed bracket 1990 indicates that external devices (e.g. RDMA) can directly access the system mass storage 1984 and traditional mass storage 1992. They can also access the content in NVDIMM1-NVDIMM8. In general, as represented by bridging arrow 1994, the transfer of data between mass storage 1984 and traditional mass storage can occur on the system network free of any intervention from the processor or host engine. As in the above depictions, the system views the NVDIMMs 1982 and storage 1984 and 1992 as a single unit (arrow 1996 and bracket 1998).

III. NVDIMM Tiers

Figure 20A:
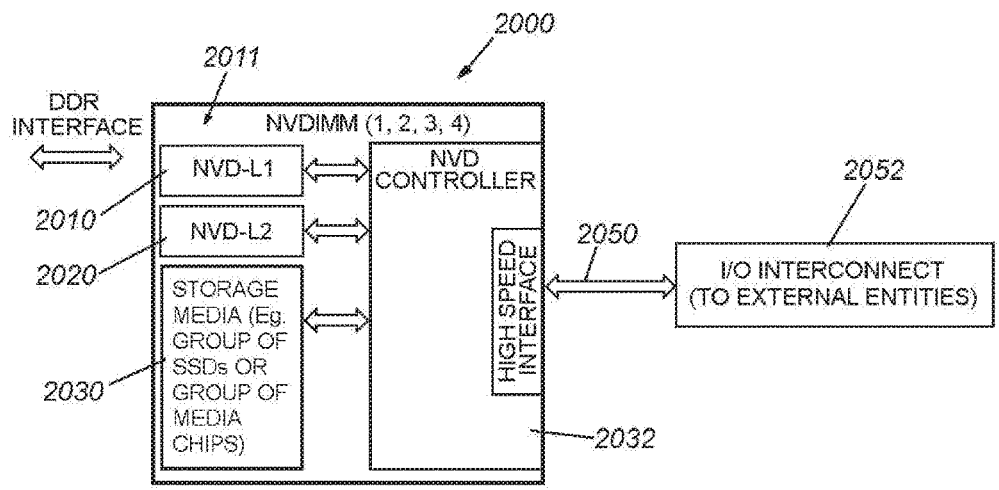
FIG. 20A is a diagram of an NVDIMM arrangement in which NVD-L1, NVD-L2 and NVD mass storage reside on the NVDIMM and communicate using an NVD controller with external world according to an embodiment.

An arrangement 2000 with multi-level cache is shown in FIG. 20A, by way of non-limiting example. As shown, either DRAM or other technologies, which share some or all of the metrics (performance, endurance, latencies, power, etc.) form the NVD-L1 cache 2010 of the NVDIMM (1, 2, 3, 4, etc.) 2011. Technologies including, but not limited to, SRAM, DRAM, Flash or other storage class memories can comprise the NVD-L2 cache 2020. While NVD-L1 cache 2010 can be either volatile or non-volatile, the NVD-L2 cache 2020 is typically non-volatile in nature, though it can be volatile in some cases. The media for the NVD mass storage 2030 may comprise any persistent memory technologies. The exemplary embodiment in FIG. 20 shows that all tiers, NVD-L1 2010, NVD-L2 2020 and NVD Mass Storage 2030, can all be placed on the same NVDIMM PCB under control of the NVD controller 2032, with a NVD Private Connection 2050 providing connectivity to external world (2052).

Figure 20B:
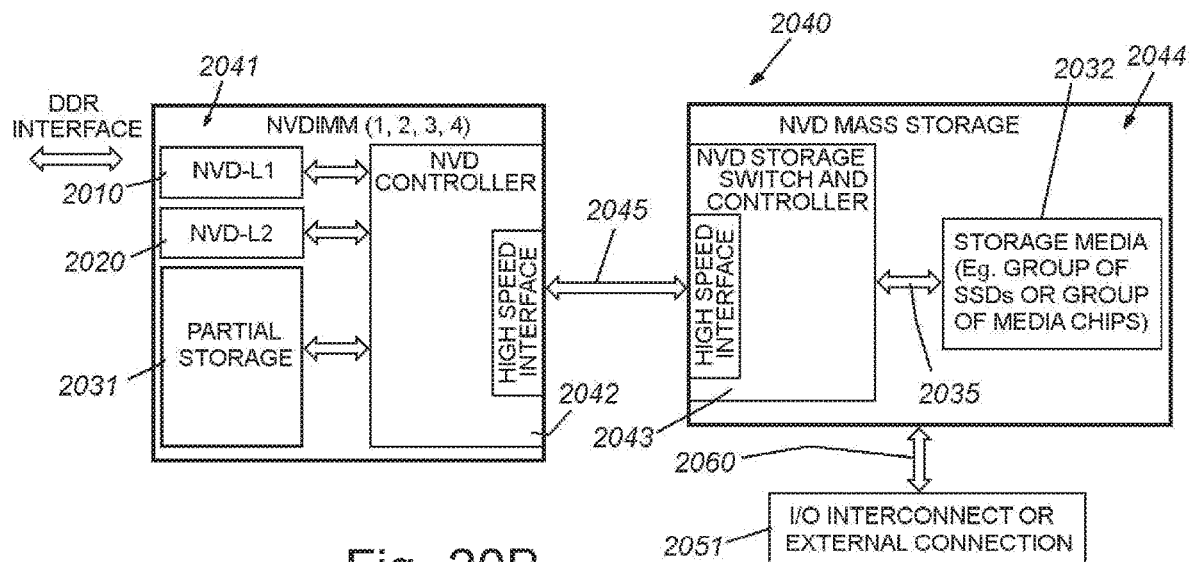
FIG. 20B is a diagram of a tiered NVDIMM arrangement in which NVD-L1 and NVD-L2 reside on the NVDIMM and communicate using an NVD controller with an NVD mass storage device, in which part of storage media resides on the NVDIMM and part of storage media resides on the NVD mass storage device, thereby providing bifurcated storage according to an embodiment.

The arrangement 2040 in the embodiment of FIG. 20B shows that the above-described NVD-L1 2010 and NVD-L2 2020 are herein placed in NVDIMM 2041, but the storage tier is spread across the two components with part of storage media 2031 can be placed on NVDIMM 2041, and part of storage media 2032 can be placed on the NVD mass storage 2044. The external connectivity 2050 to I/O interconnect or other external entities (2051) can be provided through the connection 2060. The NVD controller 2042 resides on NVDIMM 2041 and the interconnected (by bridge 2045) NVD storage switch and controller 2043 resides on the NVD mass storage 2044.

Figure 21:
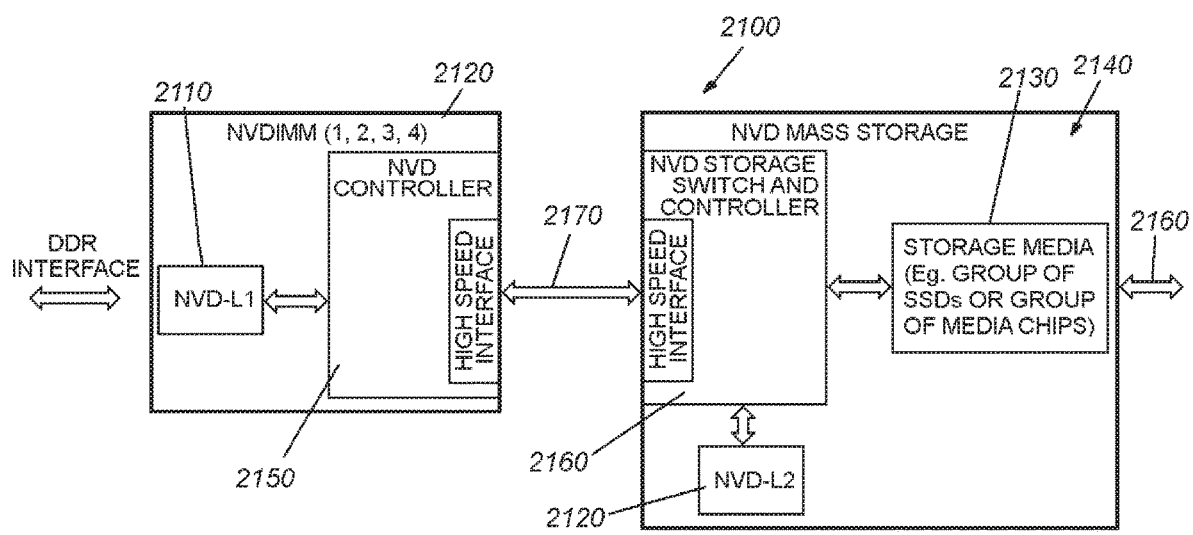
FIG. 21 is a diagram of a tiered NVDIMM arrangement in which NVD-L1 resides on the NVDIMM and NVD-L2 resides on an NVD mass storage device according to an embodiment.

Another arrangement 2100 with multi-level cache is shown in the embodiment of FIG. 21, by way of non-limiting example. The exemplary embodiment in FIG. 21 shows the NVD-L1 2110 is placed on the NVDIMM 2120. However NVD-L2 2120 and NVD mass storage media 2130 is placed on the NVD mass storage device 2140. The external connectivity is provided by the connection 2160. The NVD controller 2150 resides on the NVDIMM 2120 and the NVD storage switch and controller 2160 resides on the NVD mass storage 2140. The components are connected by bridge 2170.

IV. NVD Mass Storage Device

The NVD mass storage device can use any of the available non-volatile storage technologies that offer high density and capacities. Note that the NVD mass storage device can still use any combination of available memory and/or storage technologies as a data buffer or data cache. The instances or components of these non-volatile storage technologies are referred to as "mass storage media". The protocol used for the connection between NVDIMM and the NVD mass storage device can be any appropriate high-speed protocol technology, including, but not limited to, PCIe. The data link can be traditional cable (e.g. PCIe cables), optical cable that provides compact implementation, or any other physical or wireless connections. The NVD mass storage device can be accessible to any entity through I/O interconnect as well as the NVDIMM(s) that are connected to device. This allows the processor or DMA in the I/O chipset move the data from NVD mass storage device to other locations including network drives etc., or vice versa.

Figure 22:
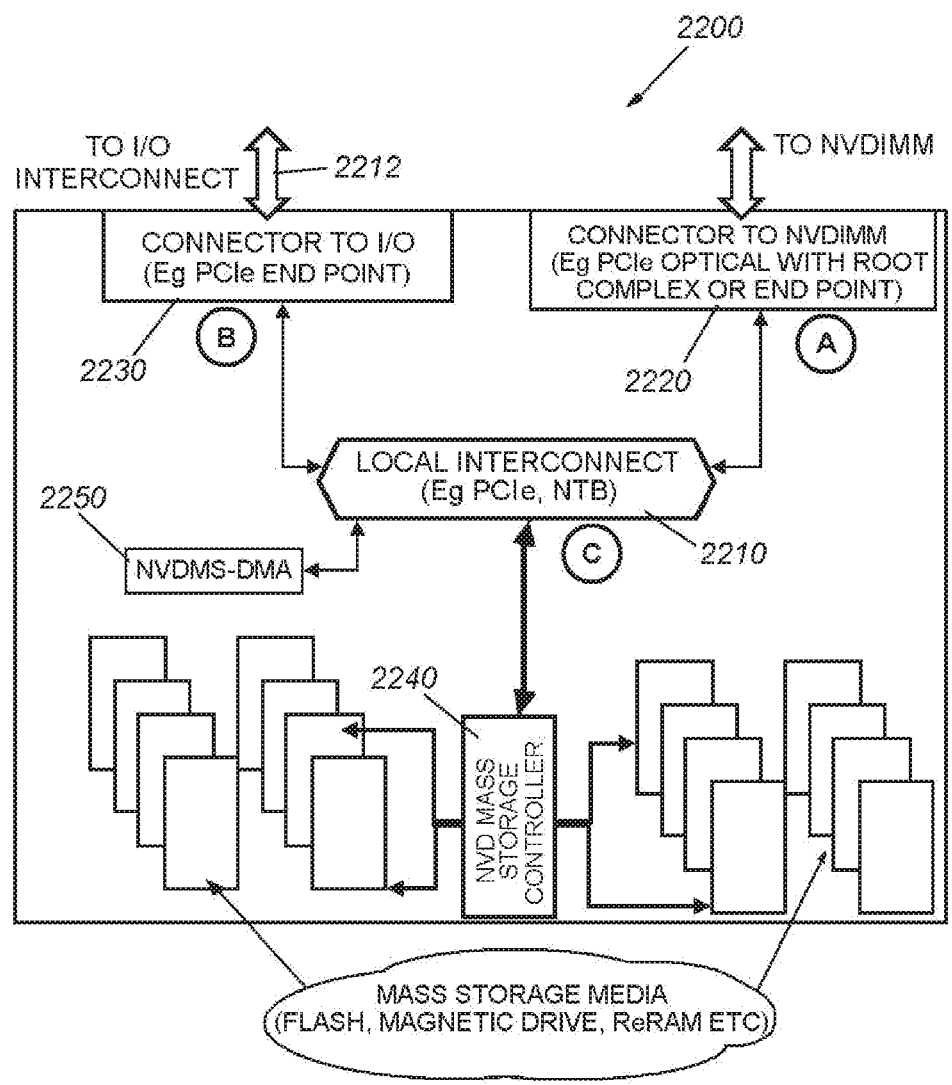
FIG. 22 is a block diagram of an NVD mass storage device, according to an exemplary embodiment.

The exemplary embodiment in FIG. 22, shows an NVD mass storage device 2200 with a PCIe data interconnect 2210, 2212, by way of non-limiting example. In embodiments, different communication protocols can be employed between different modules and/or devices within the overall mass storage environment. For example, protocol A is used to connect between the NVDIMM (via connector 2220) and the NVD-mass storage device 2200; protocol B is used to connect to the Processor I/O (via connector 2230); and protocol C is used to connect to the NVD mass storage memory controller 2240.

Figure 2:
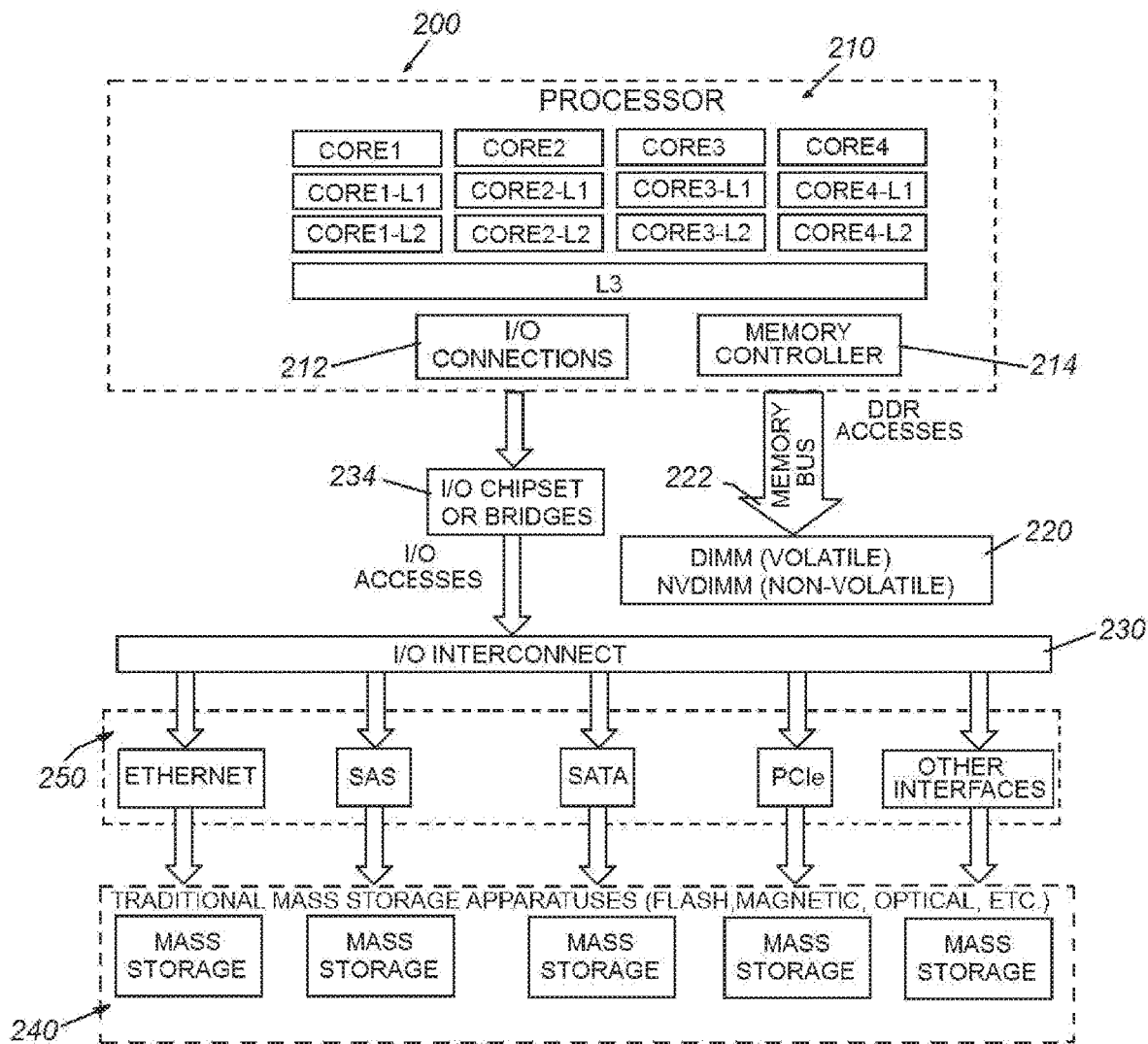
FIG. 2 is a block diagram of a conventional computing system generally in accordance with the architecture of FIG. 1, in which data storage is accessible using an external I/O chipset, according to a prior art implementation.
Figure 3:
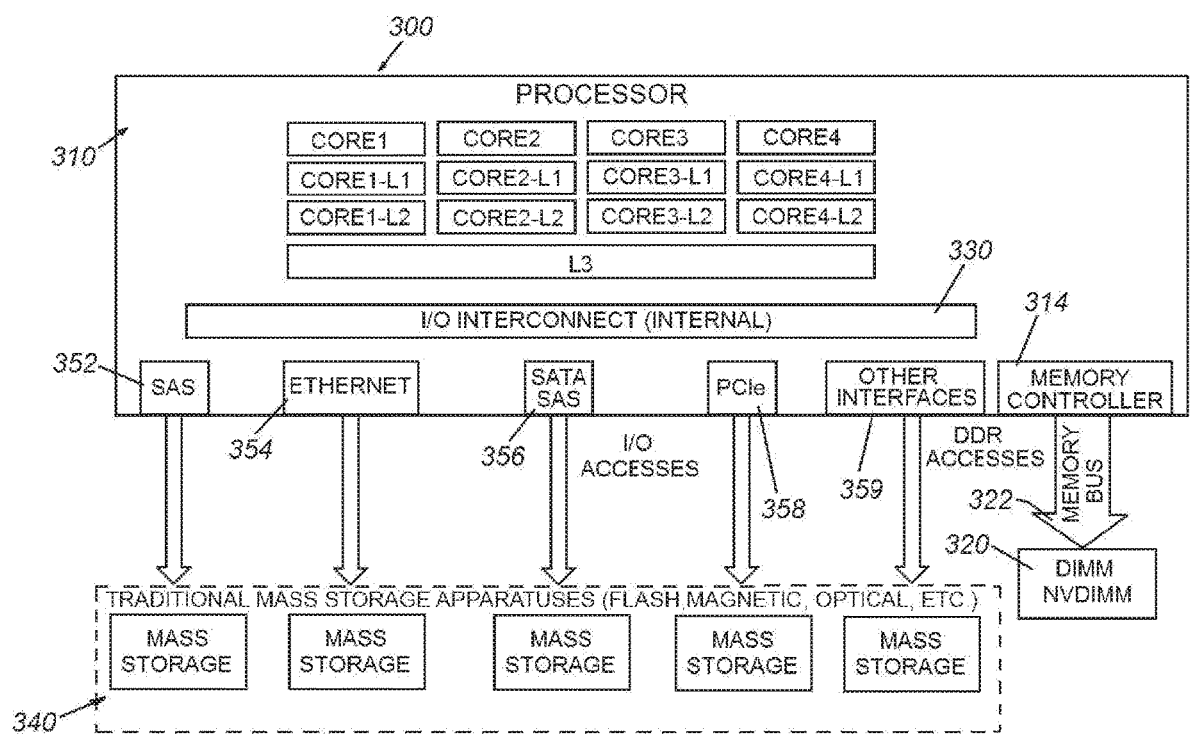
FIG. 3 is a block diagram of a conventional computing system generally in accordance with the architecture of FIG. 1, in which memory and data storage are each accessible using direct interfaces within the framework (e.g. chipset or die) of the processor, according to a prior art implementation.
Figure 4:
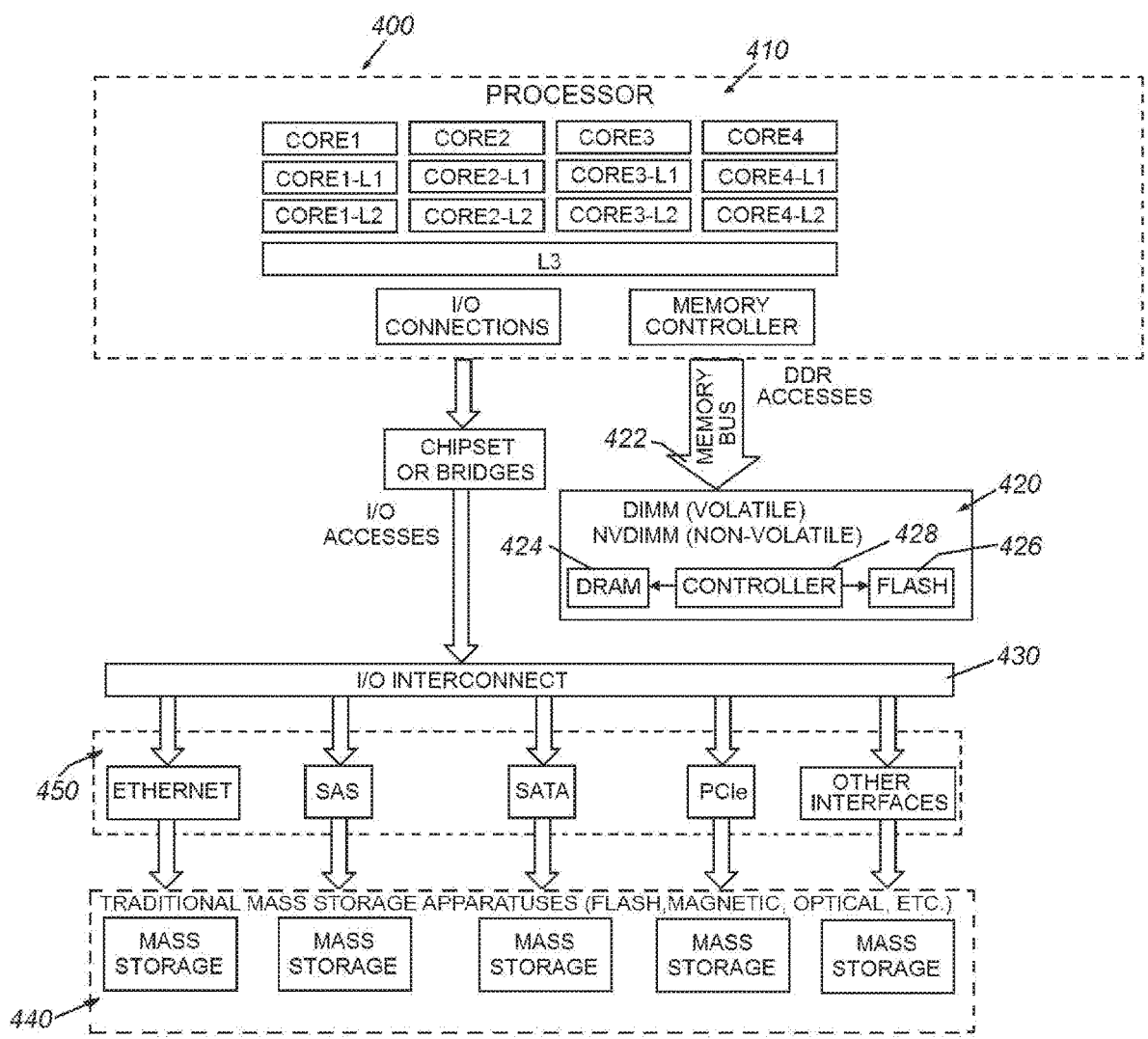
FIG. 4 is a block diagram of a conventional computing system generally in accordance with the architecture of FIG. 1, in which memory include a Flash component; according to a prior art implementation.

In the exemplary arrangement 200 of a traditional mass storage device 240, shown in FIG. 2 above, this device (on the PCIe bus) could be an NVMe drive. The NVMe drive has a PCIe slave (referred to as PCIe end point) that connects into the PCIe topology. At the root of the PCIe topology is the PCIe master (referred to as PCIe root complex). This arrangement is either part of the processor itself, or instantiated within the I/O chipset 234 as shown in FIG. 2. The PCIe end point connector to I/O 2230 in FIG. 22 is arranged similarly to this traditional arrangement of FIG. 2. Illustratively, in FIG. 22 the other NVD mass storage device access port, shown as the Connector to NVDIMM 2220 can be either a slave or a master of the respective communication protocol in use. To use the PCIe protocol, by way of example, the Connector to NVDIMM 2220 can be arranged as either a PCIe EndPoint or PCIe Root Complex. In an innovative embodiment in which the Connector to NVDIMM 2220 is a PCIe Root Complex, NVD mass storage device 2200 becomes the root of the local PCIe topology connecting NVD mass storage device with the NVDIMM or NVDIMMs. The same is applicable even if PCIe is replaced with other protocols. The benefit of this illustrative arrangement is that multiple NVDIMMs can naturally feed into the PCIe topology or other protocols with efficiency when NVD Mass Storage acts as the master on private connection 1550, independent of or in place of the memory interface 1522. The exemplary mass storage arrangement 2200 also depicts NVDMS-DMA 2250 that can be used to move the data in and out of the NVD mass storage device 2200.

V. NVD Mass Storage Device—Interleaving

The DRAM chips are typically constructed in multiple banks. In order to make the DDR accesses very efficient across DRAM banks, a method called "interleaving" is employed. This method spreads the contiguous accesses across the various DIMMs/NVDIMMs connected on the memory bus. In this method, the consecutive DDR accesses do not reside in the same NVDIMM, but instead are scattered across the NVDIMMs. When the processor moves data from the "traditional mass storage device to the group of NVDIMMs that are interleaved, each NVDIMM has only part of the original data. If data in this group of NVDIMMs is pushed downstream to the NVD mass storage device through the NVD Write Flow (see arrow 1662, shown in FIG. 16), then each NVDIMM provides a stream of data that is only part of the original data. Hence, when an NVD mass storage device is connected to several NVDIMMs that are interleaved, the data reaching NVD mass storage is a rearranged version of the original data. If this rearranged data were to be read by the processor through the I/O interconnect, then the read data would not be recognizable given the interleaved organization. In the same manner, since persistent data in NVDIMMs moves with the NVDIMMs, NVDIMM's have to be inserted in the same relative positions. Any rearrangement of the NVDIMMs can render the data unrecognizable in an interleaved setup. A similar characteristic occurs in the NVD Read Flow (see arrow 1562 in FIG. 15), when data is moved from NVD mass storage device to the group of interleaved NVDIMMs.

Figure 23:
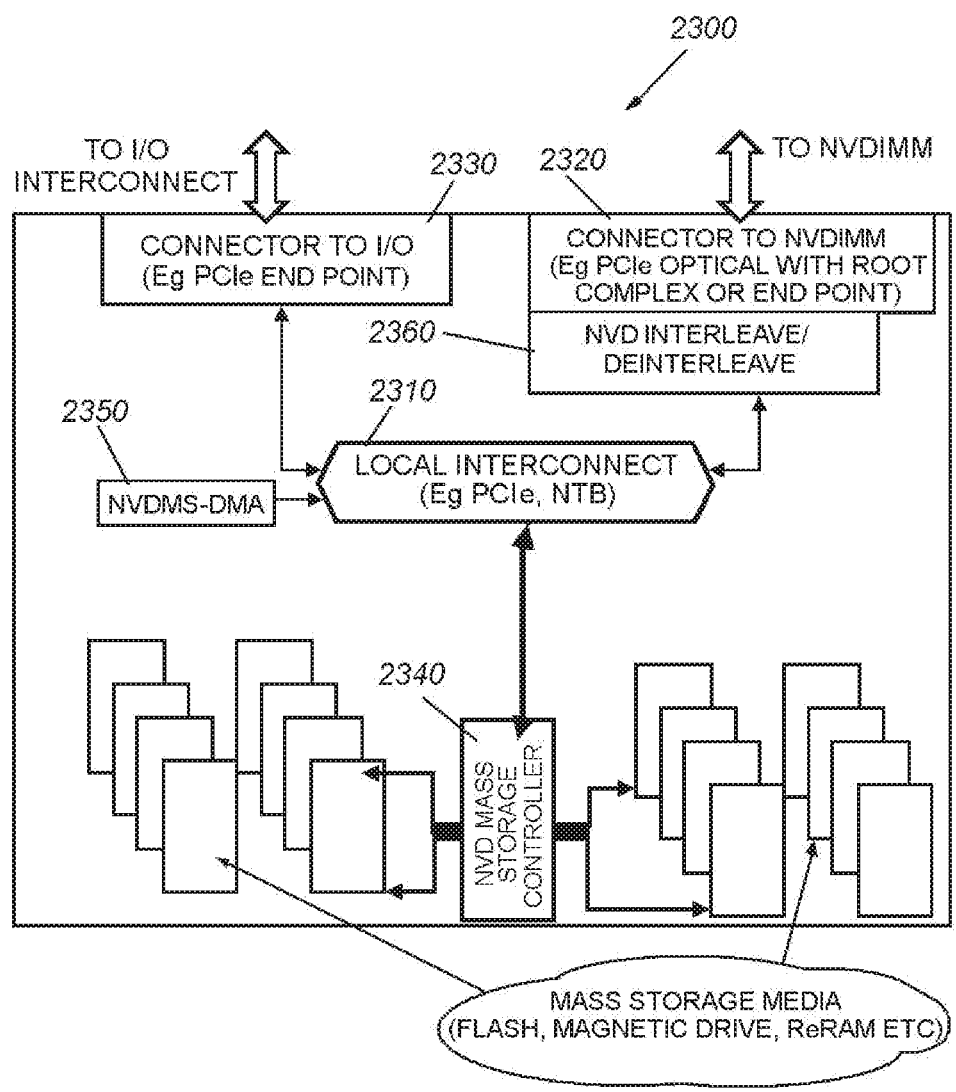
FIG. 23 is a block diagram of an NVD mass storage device with an NVD interleave/de-interleave module in path to NVDIMM, according to an exemplary embodiment.

Thus, the data handling system and method shown in the mass storage device arrangement 2300 of FIG. 23 alleviates the above-described disadvantages of the NVDIMM arrangement by employing an NVD interleave-de-interleave block 2360 to process the data coming from all the interleaved NVDIMMs and compensate for interleaving before writing into the NVD mass storage device 2300. This ensures that the data in NVD mass storage device retains the same structure as the original data, and hence, is recognizable by the processor whether it is read through the I/O interconnect or the memory bus. Similarly, it ensures that the data integrity is maintained when an external source reads the content in the NVD Mass Storage apparatus. The Connector-to-I/O 2330, Connector-to-NVDIMM 2320, local interconnect (e.g. PCIe) 2310, NVD mass storage controller 2340 and NVDMS-DMA 2350 all otherwise function similarly or identically to their corresponding elements in the mass storage device 2200 in this embodiment.

Figure 24A:
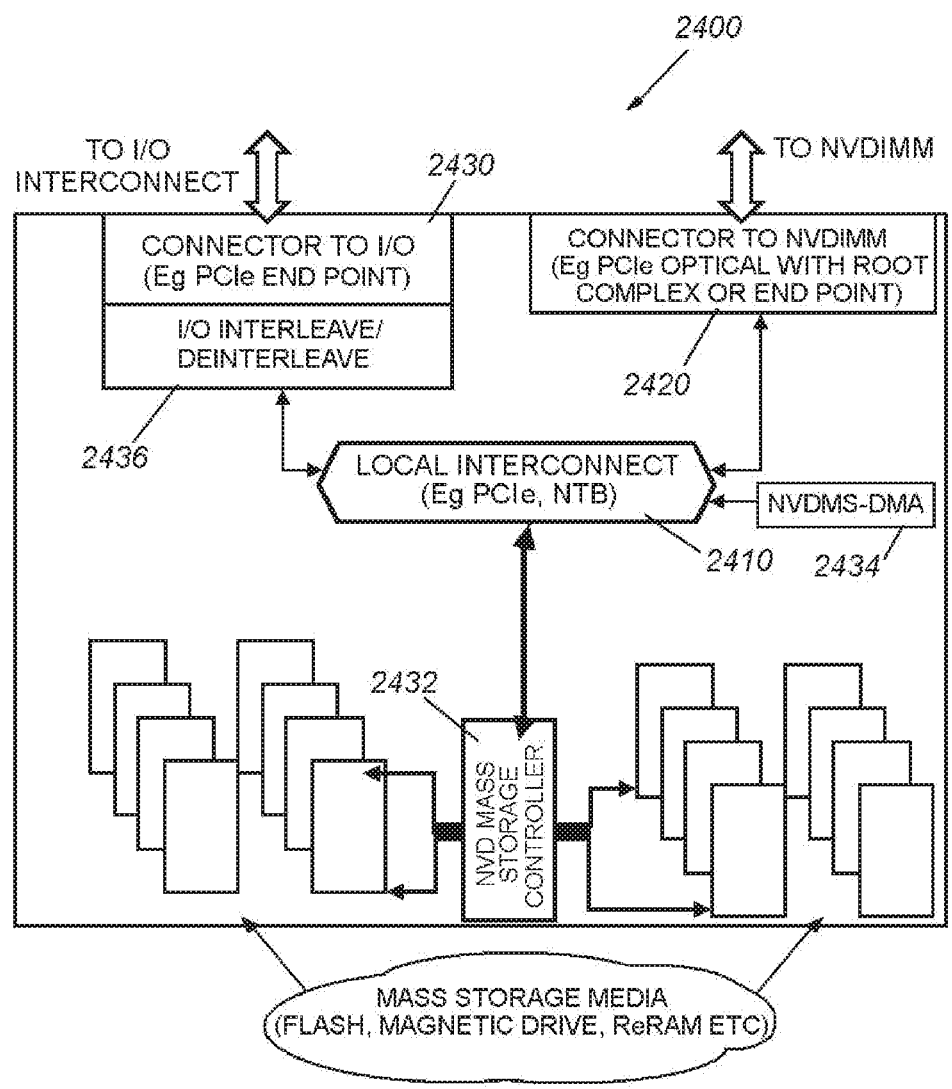
FIG. 24A is a block diagram of an NVD mass storage device, with an I/O interleave/de-interleave module in path to I/O interconnect according to an exemplary embodiment.

In an alternate embodiment of a mass storage arrangement 2400, shown in FIG. 24A, the data entering the NVD mass storage device 2400 as separate data streams is stored as is without any processing. The interleave/de-interleave logic/module is placed on the I/O interconnect path, referred to as I/O interleave-de-interleave 2460. In this arrangement, the data stored in the NVD mass storage device 2400 resembles the interleaved data stored in the NVDIMMs. However, the data is processed before it is passed on to the I/O interconnect. In a similar manner, the data coming from the I/O interconnect passes through the I/O interleave-de-interleave module 2436 prior to being written in the media. The Connector-to-I/O 2430, Connector-to-NVDIMM 2420, local interconnect (e.g. PCIe) 2410, NVD mass storage controller 2432 and NVDMS-DMA 2434 all otherwise function similarly or identically to their corresponding elements in the above-described mass storage devices 2200 and 2300 in this embodiment.

Figure 24B:
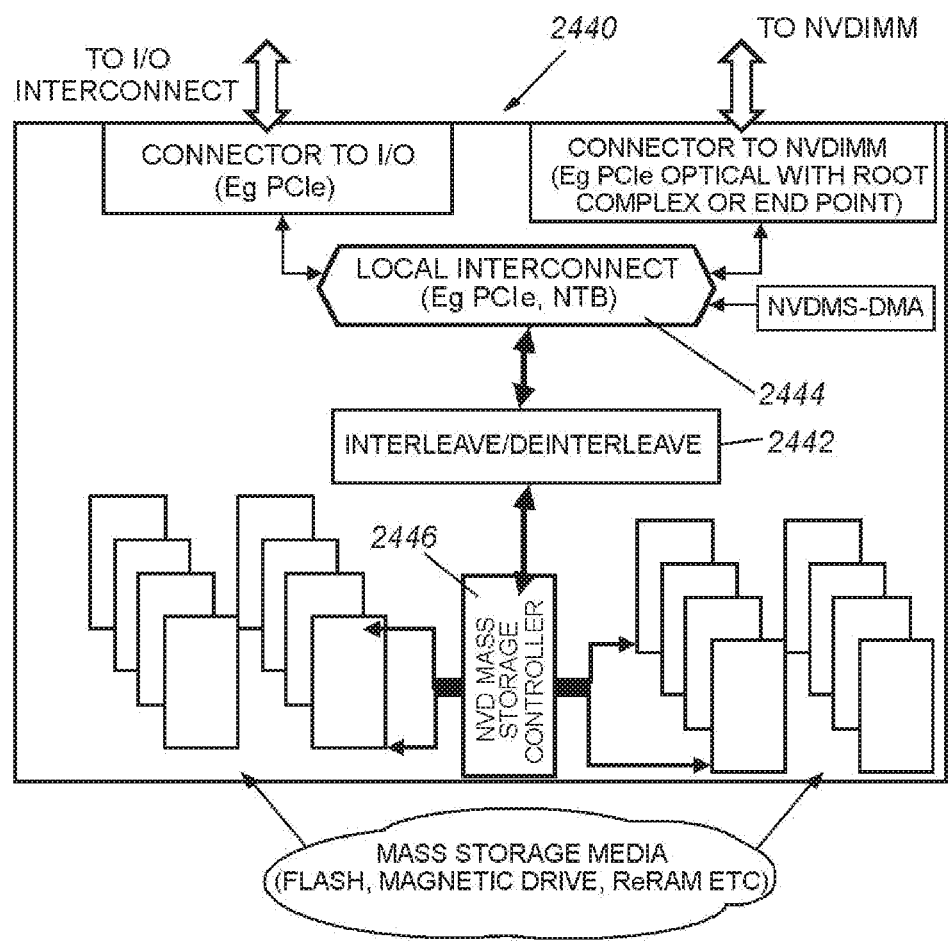
FIG. 24B is a block diagram of an NVD mass storage device, with an interleave/de-interleave module located between the interconnect and the mass storage according to an alternate embodiment.

FIG. 24B shows an arrangement 2440 according to an alternate embodiment, in which the interleave and de-interleave process(or) 2442 is located between the interconnect 2444 and the NVD mass storage controller 2446.

Figure 24C:
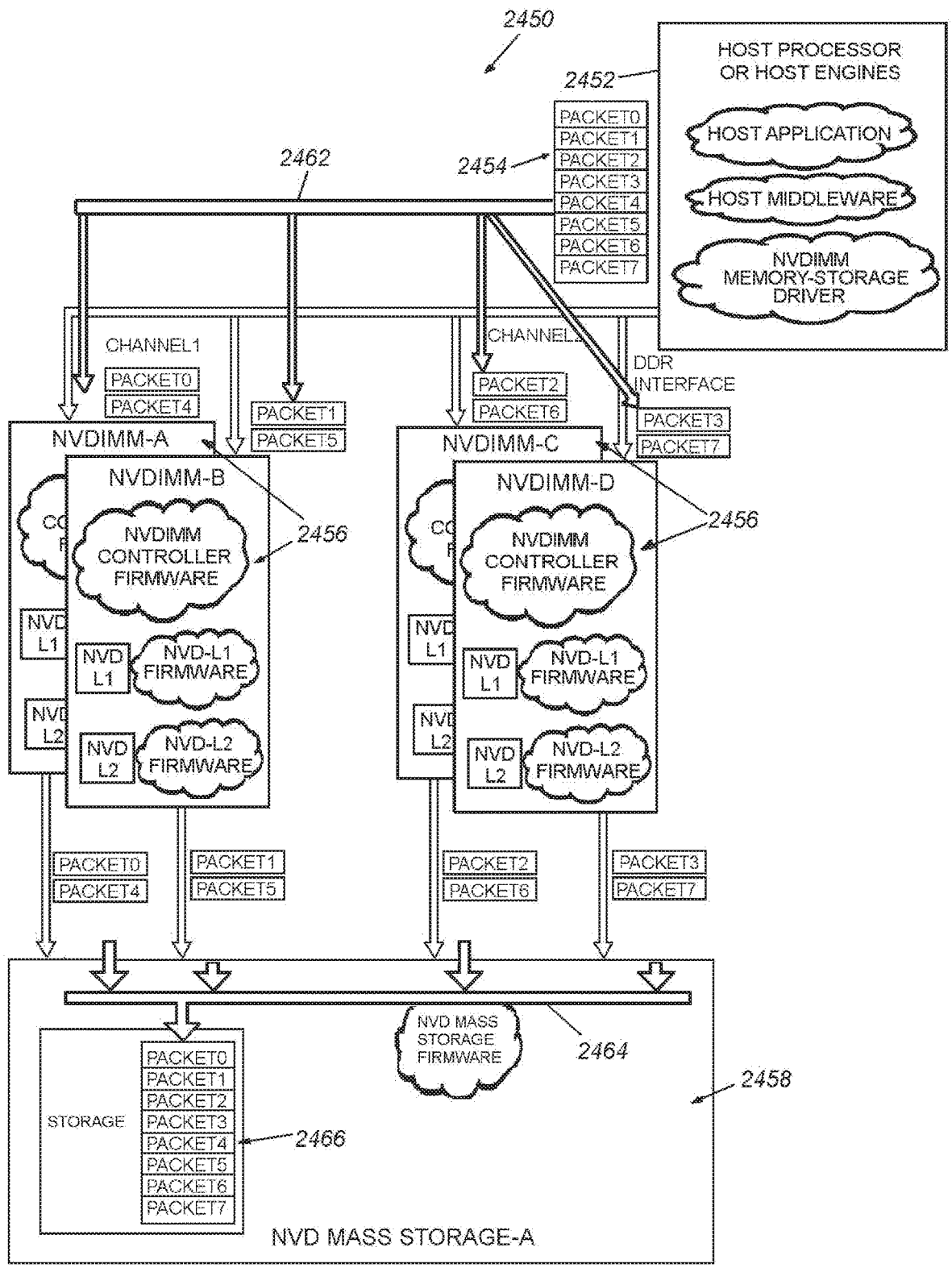
FIG. 24C is a block diagram showing the handling of interleaved/de-interleaved packet data transferred in a write operation between the mass storage to the host processor through NVDIMMs according to an exemplary embodiment.

FIG. 24C depicts in more detail one half 2450 of the exemplary arrangement 2440 in FIG. 24B (i.e. Memory Channel 1 and 2) to illustrate how the arrangement handles interleaved data issuing from the host processor 2452. This example depicts a host write operation (arrows 2462 and 2464) in interleaved mode, where the processor scatters the data packets (e.g. Packet 0-Packet7) 2454 across the DIMMs or NVDIMMs (NVDIMM-A, NVDIMM-B, NVDIMM-C and NVDIMM-D) 2456. In this novel implementation and technique, the arrangement 2450 behaves generally in the manner of an NVD Write Flow (per arrows 2462 and 2464), where the distributed data packets (0-7) moving from NVDIMMs to NVD mass storage device 2458 can be merged again in the NVD Mass Storage device 2458 to restore the original order provided in the host processor 2452 (i.e. packets 2466).

Figure 24D:
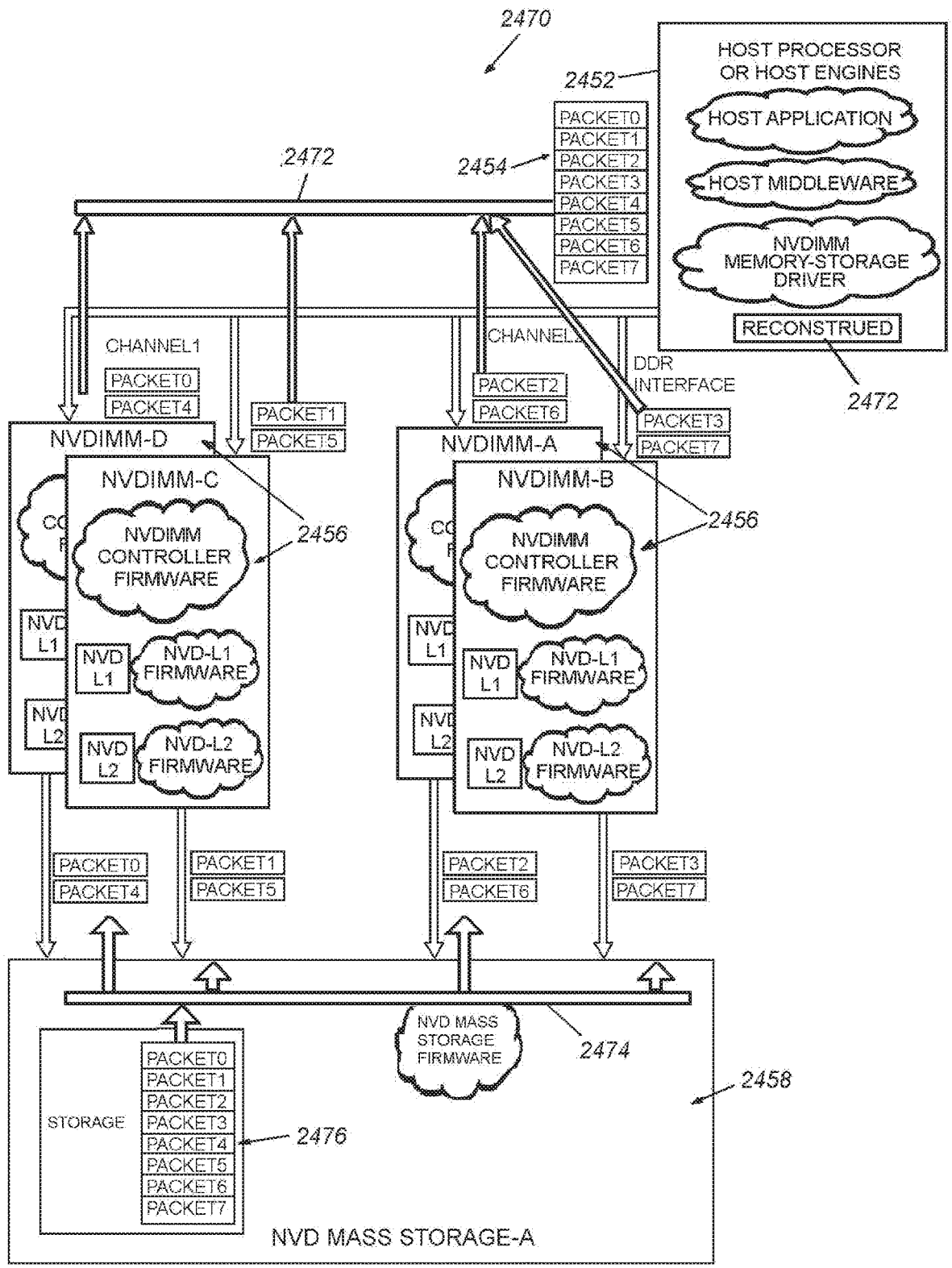
FIG. 24D is a block diagram showing the handling of interleaved/de-interleaved packet data transferred in a read operation between the mass storage to the host processor through NVDIMMs according to an exemplary embodiment.

FIG. 24D shows an arrangement 2470 similar or identical to the arrangement 2450 of FIG. 24, which demonstrates the NVD Read Flow (arrows 2472 and 2474). In the depicted novel approach, data packets 2476 (e.g. Packet0-7) from mass storage 2458 are appropriately scattered across the NVDIMMs 2456 in such a way that, as host processor 2452 reads the packets in interleaved mode, it is able to appropriately reconstruct the original order using a reconstruction process(or) 2472.

Typical NVDIMM's move the data content along with the NVDIMM, so rearranging the NVDIMMs as shown below (NVDIMM-D, NVDIMM-C, NVDIMM-A and NVDIMM-B) 2456 can traditionally lead to system crash. However, the novel arrangement and technique described herein can recognize the position of each NVDIMM, and appropriately move the data based on the NVDIMM's position, rather than the identity of the NVDIMM. Thus, by way of example, even if NVDIMM-D is inserted in the first memory slot (that is normally occupied by (e.g.) NVDIMM-A) of the system memory board, the arrangement remains functionally robust. In other words, the NVDIMMs or other memory structures can be swapped across the slots without (free of) affecting the overall organization of data packets moving between mass storage and the processor.

VII. NVD Mass Storage Device—Energy Apparatus

Figure 25:
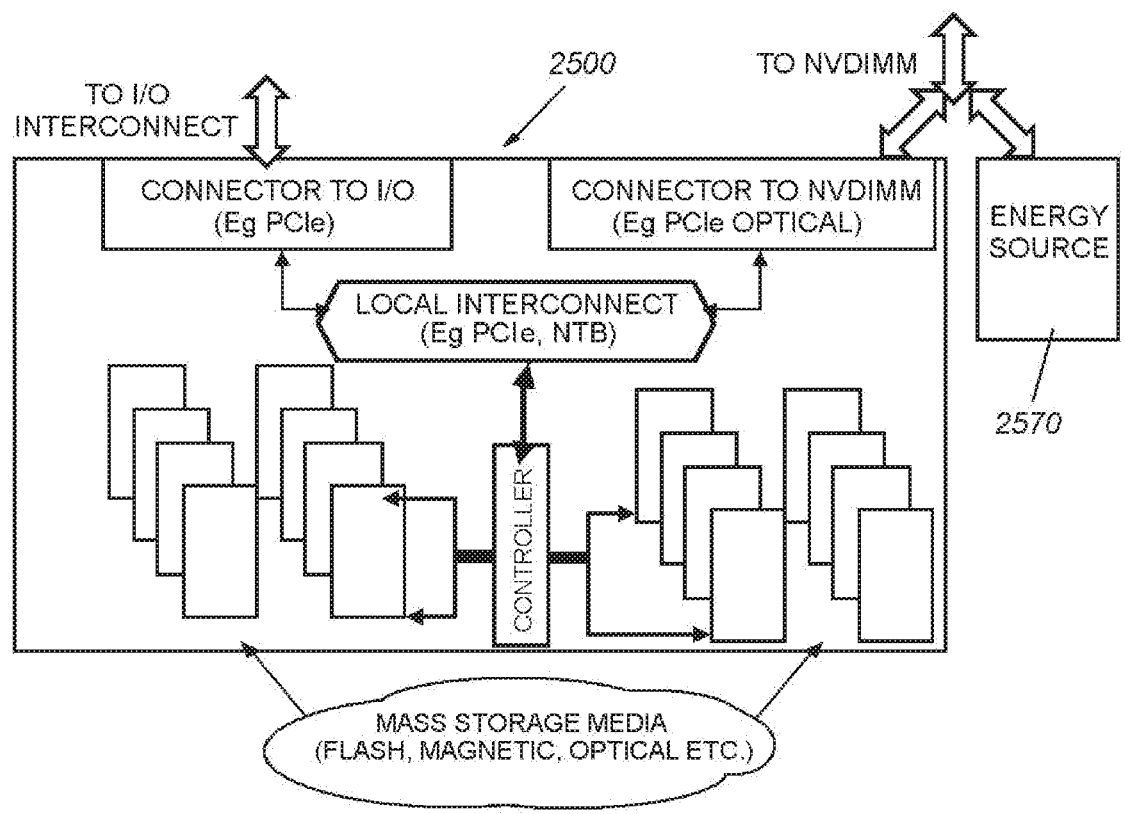
FIG. 25 is a block diagram of an NVD mass storage device with an integrated energy source, according to an exemplary embodiment.
Figure 26:
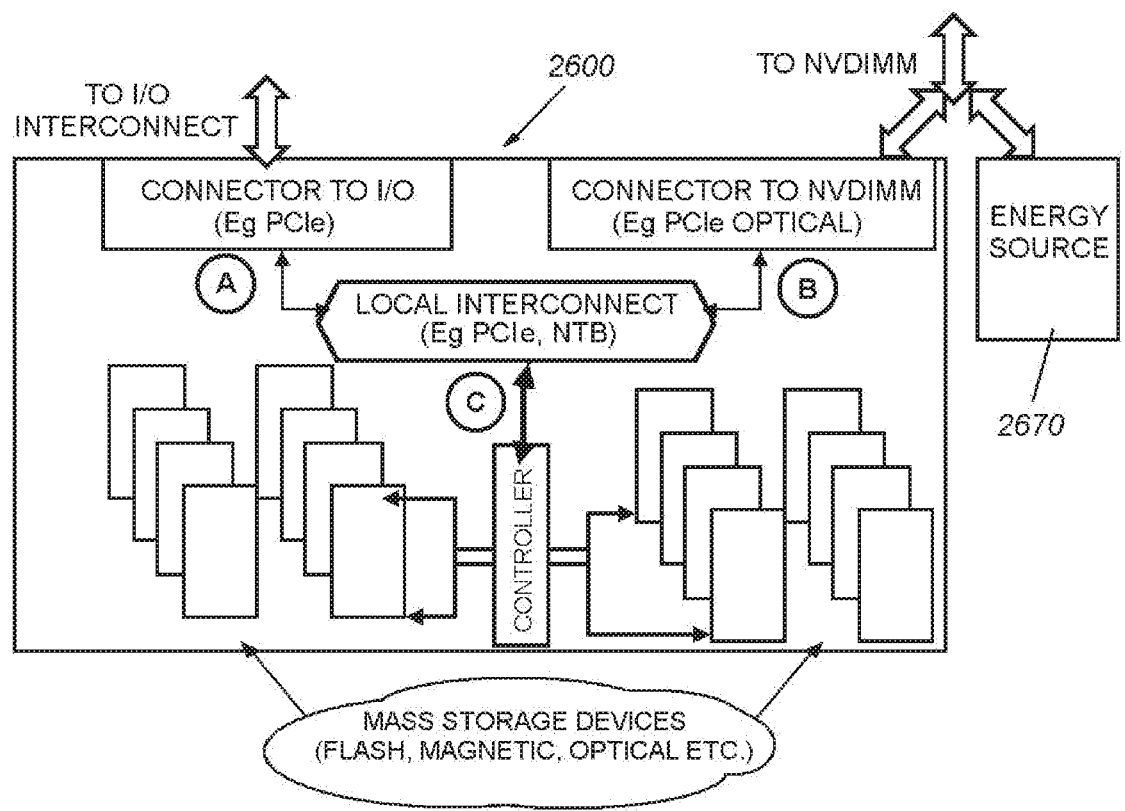
FIG. 26 is a block diagram of an NVD mass storage device with a separate, interconnected energy source, according to an exemplary embodiment.

If the NVD-L1 cache is comprised of volatile memory, then NVDIMM will have to backup the data onto the non-volatile memory downstream in the cache-hierarchy. For this reason, NVDIMM's with volatile memory as NVD-L1 cache typically require an energy source to power the module and related components for a backup operation. Similarly, NVD-L2 and even mass storage requires limited power provisioning to avoid loss of data during unexpected events. In an exemplary embodiment, the energy source/power supply 2570 can be placed either on the NVDIMM PCB itself or on the NVD mass storage device 2500, as shown in FIG. 25. In another exemplary embodiment, the energy source/power supply can be located separate from the NVD mass storage device 2600, as shown in FIG. 26. In the event that power is lost to the overall system platform, this energy source can provide persistent backup, regardless of the state of the platform's energy source. As such, it should be sufficient to finish any remaining storage operations within the mass storage array. In existing implementations, NVDIMMs have separate power provisioning that is either distributed across NVDIMMs or consolidated in one place. Similarly, Solid State Drives (SSD) sometimes have their own provisioning for completing transactions that are in progress when power failure happens. In the novel arrangement and technique described in the embodiments here, the entire multi-level memory, storage hierarchy and related assemblies, including all the NVD storage tiers and the NVD mass storage can be partitioned into a single power domain that can be provisioned separately from rest of the system.

It should be clear that the above-described embodiments of a multi-level data cache on storage on a memory bus provides a robust and efficient system and method for optimizing use of all available storage in association with a processor arrangement. This system and method allows for data access in a traditional manner, while also employing a DRAM-access memory bus to directly access both DRAM based memory and other forms of non-volatile storage, including emerging memory types, such as storage class memory. This system and method also allows for interleaving of memory and storage structures for increased efficiency.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances (e.g. 1-2%) of the system. Note also, as used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software (e.g. firmware). More generally, the computing systems contemplated herein can include one or more features of the conventional systems described (e.g.) in FIGS. 1-4, and adapted to interoperate with the novel memory-storage combine and other features described according to the illustrative embodiments. Additionally, the term NVDIMM as used herein should be taken broadly to include a variety of memory structures and/or combination of memory components that should be clear to those of skill, and not limited to a DRAM or other like arrangement. Accordingly, this description is meant to be taken only by way of example, and not to otherwise limit the scope of this invention.

What is claimed is:

1. A computing system comprising:
   a processor assembly interconnected to a memory-storage combine through a single memory bus, adapted to allow access, through the single memory bus, of a combination of different memory types; and
   a controller that is arranged to address the combination of memory types as part of a unified address space via the single memory bus.

2. The computing system as set forth in claim 1 wherein the combination is organized in layers of memory in a manner in which at least one of the layers constitutes a final resting place for data employed by the processor.

3. The computing system as set forth in claim 2 further comprising an I/O interconnect for accessing a non-volatile mass data storage.

4. The computing system as set forth in claim 2 further comprising a backdoor interconnect that allows communication between external devices and the non-volatile mass data storage.

5. The computing system as set forth in claim 2 wherein the different memory types include a random access memory (RAM) and a non-volatile mass data storage.

6. The computing system as set forth in claim 5 wherein the RAM based data storage defines an NVDIMM memory structure.

7. The computing system as set forth in claim 4 wherein the NVDIMM memory structure includes Storage Class memory.

8. The computing system as set forth in claim 7 wherein the NVDIMM memory structure is organized to include at least a first layer NVD cache having DRAM and a second layer NVD cache having the Storage Class memory.

9. The computing system as set forth in claim 7 wherein the second layer NVD cache includes solid state drives (SSDs).

10. A computing system comprising:
    a processor including a controller interconnected to a control of an NVDIMM arrangement through a single memory bus;
    a mass storage interconnected with the NVDIMM arrangement and that is addressable via the single memory bus that provides a final resting place for data passing between the processor, the NVDIMM arrangement and the mass storage, the NVDIMM arrangement and the mass storage defining a memory combination; and a private high speed connection that mates the NVDIMM controller with the mass storage.

11. A computing system comprising:
a processor including a controller interconnected to a plurality of memory structures through a single memory bus;
a mass storage interconnected with the memory structures and that is addressable via the single memory bus that provides a final resting place for data passing between the processor, the memory structures and the mass storage; and
a backdoor arrangement that interconnects the mass storage to external devices free of interconnection to the processor.

12. A method for handling data in a computing system comprising the steps of:
providing a processor interconnected to an NVDIMM arrangement through a single memory bus;
interconnecting a mass storage that defines part of an address space on the single memory bus; and
addressing memory to each of the NVDIMM arrangement and the mass storage as part of an overall address space to be used by the processor, data being stored in the mass storage as a final resting place therefor.

13. The method as set forth in claim 12 further comprising providing layers of cache for storing the data and designating at least one layer as the final resting place.

* * * * *